US012770222B2

(12) United States Patent
Zhang et al.

(10) Patent No.: US 12,770,222 B2
(45) Date of Patent: Oct. 20, 2026

(54) IMAGE PROCESSING METHOD AND APPARATUS, COMPUTER DEVICE, PROGRAM, AND STORAGE MEDIUM

(71) Applicant: Tencent Technology (Shenzhen) Company Limited, Shenzhen (CN)

(72) Inventors: Xinyi Zhang, Shenzhen (CN); Junwei Zhu, Shenzhen (CN); Wenqing Chu, Shenzhen (CN); Ying Tai, Shenzhen (CN); Chengjie Wang, Shenzhen (CN); Jilin Li, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 669 days.

(21) Appl. No.: 18/070,305

(22) Filed: Nov. 28, 2022

(65) Prior Publication Data

US 2023/0098548 A1 Mar. 30, 2023

Related U.S. Application Data

(63) Continuation of application No. PCT/CN2022/090153, filed on Apr. 29, 2022.

(30) Foreign Application Priority Data

May 20, 2021 (CN) ......................... 202110551653.9

(51) Int. Cl.

| | |
|---|---|
| ***G06T 5/50*** | (2006.01) |
| ***G06T 3/40*** | (2024.01) |
| ***G06T 3/4053*** | (2024.01) |

(52) U.S. Cl.
CPC .............. *G06T 5/50* (2013.01); *G06T 3/4053* (2013.01); *G06T 2207/20081* (2013.01); *G06T 2207/20084* (2013.01); *G06T 2207/20221* (2013.01)

(58) Field of Classification Search
CPC ..................... G06T 5/50; G06T 3/4053; G06T 2207/20081; G06T 2207/20084;
(Continued)

(56) References Cited

U.S. PATENT DOCUMENTS 12,086,995 B2 * 9/2024 Benou .................. G06V 10/454
2006/0291750 A1 12/2006 Milanfar et al.
(Continued)

FOREIGN PATENT DOCUMENTS

CN 104240186 A * 12/2014
CN 108427927 A 8/2018
(Continued)

OTHER PUBLICATIONS

Tencent Technology, WO, PCT/CN2022/090153, Jun. 23, 2022, 5 pgs.
(Continued)

*Primary Examiner* — Oneal R Mistry
*Assistant Examiner* — Jongbong Nah
(74) *Attorney, Agent, or Firm* — Morgan, Lewis & Bockius LLP

(57) ABSTRACT

A computing device acquires an original image sequence. The device performs image preprocessing on the original image sequence to obtain a feature map sequence and a confidence map sequence that are corresponding to the original image sequence. The device performs feature fusion on the feature map sequence based on the confidence map sequence, to obtain a target fused feature map corresponding to a target original image frame in the original image
(Continued)

sequence. The device reconstructs the target original image frame based on the target fused feature map to obtain a target reconstructed image frame. Credibility supervision at the pixel level is performed on features in the feature fusion process to guide the fusion of image features with high credibility, thereby improving the image quality of a reconstructed image.

17 Claims, 11 Drawing Sheets

(58) Field of Classification Search
CPC . G06T 2207/20221; G06T 2207/10016; G06T 2200/32; G06T 5/73; G06N 3/084; G06N 3/045; G06N 3/08; G06F 18/253; G06V 20/46
See application file for complete search history.

(56) References Cited

U.S. PATENT DOCUMENTS

2016/0335809 A1* 11/2016 Forutanpour ........... G06T 17/00
2018/0309974 A1* 10/2018 Varekamp ............ H04N 13/106
2020/0327646 A1 10/2020 Xu et al.
2020/0402243 A1 12/2020 Benou et al.
2021/0201071 A1* 7/2021 Liao ........................ G06T 11/10
2021/0241470 A1* 8/2021 Tang .................... G06V 10/443
2022/0284552 A1* 9/2022 Yang .......................... G06T 5/80

FOREIGN PATENT DOCUMENTS

CN 110070511 A * 7/2019 ............. G06V 20/48
CN 111047516 A 4/2020
CN 111080593 A 4/2020
CN 111340694 A 6/2020
CN 111639719 A 9/2020
CN 112990171 A 6/2021

OTHER PUBLICATIONS

Tencent Technology, IPRP, PCT/CN2022/090153, Nov. 21, 2023, 6 pgs.
Jaeyeon Kang et al., "Deep Space-Time Video Upsampling Networks", Aug. 10, 2020, 17 pgs.
Tencent Technology, ISR, PCT/CN2022/090153, Jul. 15, 2022, 3 pgs.
Xintao Wang et al., "EDVR: Video Restoration with Enhanced Deformable Convolutional Networks" IEEE, ICVF Conference on Computer Vision and Pattern Recognition (CVPR), Jun. 30, 2019, 10 pgs.

* cited by examiner

IMAGE PROCESSING METHOD AND APPARATUS, COMPUTER DEVICE, PROGRAM, AND STORAGE MEDIUM

RELATED APPLICATION

This application is a continuation application of PCT Patent Application No. PCT/CN2022/090153, entitled "IMAGE PROCESSING METHODS, DEVICES, COMPUTER EQUIPMENT, PROGRAMS AND STORAGE MEDIA" filed on Apr. 29, 2022, which claims priority to Chinese Patent Application No. 202110551653.9, filed with the State Intellectual Property Office of the People's Republic of China on May 20, 2021, and entitled "IMAGE PROCESSING METHOD AND APPARATUS, COMPUTER DEVICE, AND STORAGE MEDIUM", all of which are incorporated herein by reference in their entirety.

FIELD OF THE TECHNOLOGY

Embodiments of this application relate to the field of image processing, and in particular, to an image processing method and apparatus, a computer device, a program, and a storage medium.

BACKGROUND OF THE DISCLOSURE

With the development of deep learning technology, there is an increasing number of application fields of deep learning, such as the field of image processing. In image processing, the level of image quality directly affects the quality of subsequent visual processing results. In the imaging process, images of poor quality are often acquired due to turbid media in the atmosphere or other external factors. Exploring ways to reconstruct low-quality images into high-quality images has attracted more attention.

SUMMARY

Embodiments of this application provide an image processing method and apparatus, a computer device, a program, and a storage medium, which can improve the quality of image processing. The technical solutions are described as the aspects below.

According to an aspect, an image processing method is provided. The method is performed in a computer device and includes:

acquiring an original image sequence, the original image sequence including at least three original image frames;

performing image preprocessing on the original image sequence to obtain a feature map sequence corresponding to the original image sequence and a confidence map sequence corresponding to the original image sequence. The feature map sequence is a sequence of feature maps obtained by performing feature extraction on all of the original image frames. The confidence map sequence includes confidence maps corresponding to all of the original image frames. Each, confidence map of the confidence maps corresponds to a respective one of the original image frames and is used for representing confidence levels of pixel points in the respective one of the original image frames during feature fusion;

performing the feature fusion on the feature map sequence based on the confidence map sequence, to obtain a target fused feature map corresponding to a target original image frame in the original image sequence; and reconstructing the target original image frame based on the target fused feature map to obtain a target reconstructed image frame.

According to another aspect, an image processing method is provided. The method is performed at a computer device and includes:

acquiring a sample image sequence and a reference image sequence, the sample image sequence including at least three sample image frames, and the reference image sequence being a sequence formed by reference image frames corresponding to the sample image frames;

performing image preprocessing on the sample image sequence by using an image preprocessing network, to obtain a sample feature map sequence corresponding to the sample image sequence and a sample confidence map sequence corresponding to the sample image sequence, the sample feature map sequence being a sequence of feature maps obtained by performing feature extraction on all of the sample image frames, the sample confidence map sequence including sample confidence maps corresponding to all of the sample image frames, the sample confidence map corresponding to each of the sample image frames being used for representing confidence levels of pixel points in each of the sample image frames during feature fusion;

performing the feature fusion on the sample feature map sequence based on the sample confidence map sequence, to obtain a target sample fused feature map corresponding to a target sample image frame in the sample image sequence; and reconstructing the target sample image frame based on the target sample fused feature map to obtain a sample reconstructed image frame; and training the image preprocessing network based on a target reference image frame and the sample reconstructed image frame, the target reference image frame being a reference image frame corresponding to the target sample image frame in the reference image sequence.

According to another aspect, an image processing apparatus is provided. The apparatus includes:

a first acquisition module, configured to acquire an original image sequence, the original image sequence including at least three original image frames;

a first processing module, configured to perform image preprocessing on the original image sequence to obtain a feature map sequence corresponding to the original image sequence and a confidence map sequence corresponding to the original image sequence, the feature map sequence being a sequence of feature maps obtained by performing feature extraction on all of the original image frames, the confidence map sequence including confidence maps corresponding to all of the original image frames, the confidence map corresponding to each of the original image frames being used for representing confidence levels of pixel points in each of the original image frames during feature fusion;

a first feature fusion module, configured to perform the feature fusion on the feature map sequence based on the confidence map sequence, to obtain a target fused feature map corresponding to a target original image frame in the original image sequence; and a first image reconstruction module, configured to reconstruct the target original image frame based on the target fused feature map to obtain a target reconstructed image frame.

According to another aspect, an image processing apparatus is provided, the apparatus including:

a second acquisition module, configured to acquire a sample image sequence and a reference image sequence, the sample image sequence including at least three sample image frames, and the reference image sequence being a sequence formed by reference image frames corresponding to the sample image frames;

a second processing module, configured to perform image preprocessing on the sample image sequence by using an image preprocessing network, to obtain a sample feature map sequence corresponding to the sample image sequence and a sample confidence map sequence corresponding to the sample image sequence, the sample feature map sequence being a sequence of feature maps obtained by performing feature extraction on all of the sample image frames, the sample confidence map sequence including sample confidence maps corresponding to all of the sample image frames, the sample confidence map corresponding to each of the sample image frames being used for representing confidence levels of pixel points in each of the sample image frames during feature fusion;

a second feature fusion module, configured to perform the feature fusion on the sample feature map sequence based on the sample confidence map sequence, to obtain a target sample fused feature map corresponding to a target sample image frame in the sample image sequence;

a second image reconstruction module, configured to reconstruct the target sample image frame based on the target sample fused feature map to obtain a sample reconstructed image frame; and a training module, configured to train the image preprocessing network based on a target reference image frame and the sample reconstructed image frame, the target reference image frame being a reference image frame corresponding to the target sample image frame in the reference image sequence.

According to another aspect, a computer device is provided, the computer device including a processor and a memory, the memory storing at least one program, the at least one program being loaded and executed by the processor to implement the image processing method described in the foregoing aspects.

According to another aspect, a non-transitory computer-readable storage medium is provided, the storage medium storing at least one instruction, at least one program, a code set, or an instruction set, the at least one instruction, the at least one program, the code set, or the instruction set being loaded and executed by a processor to implement the image processing method described in the foregoing aspects.

According to another aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing image processing method.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
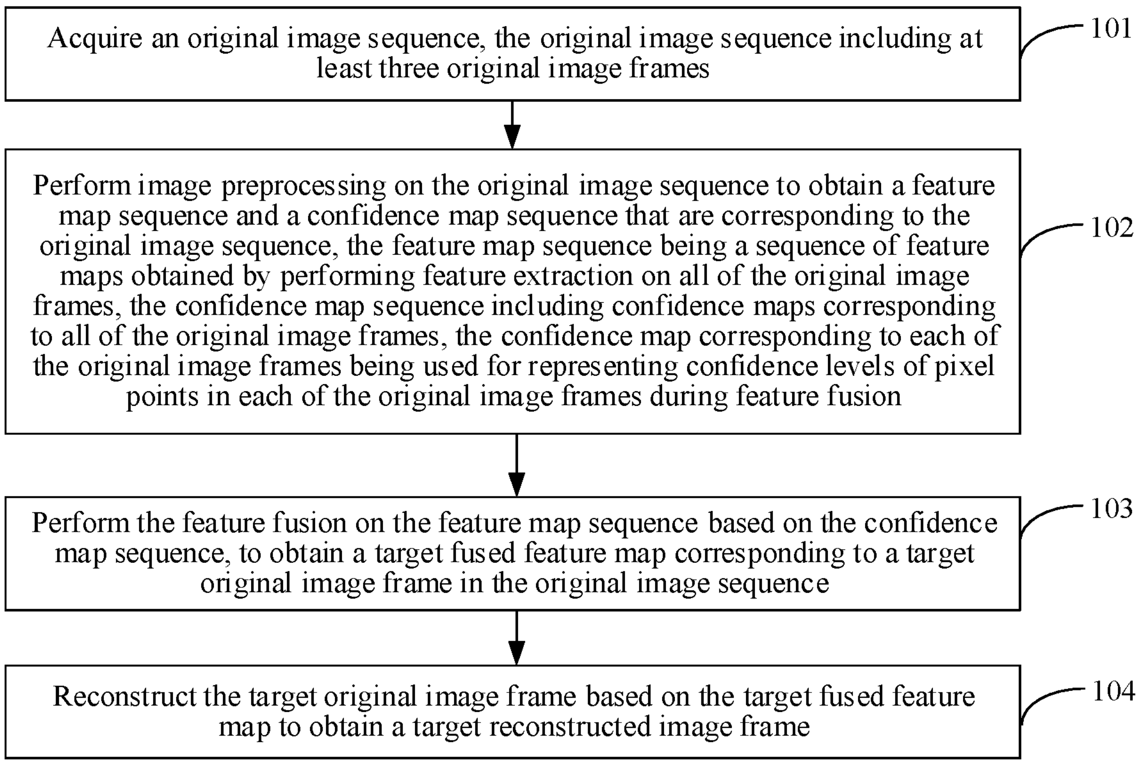
FIG. 1 is a flowchart of an image processing method according to an exemplary embodiment of this application.

To make the objectives, technical solutions, and advantages of this application clearer, the following further describes implementations of this application in detail with reference to the accompanying drawings.

First, terms involved in the embodiments of this application are briefly introduced.

1) Confidence map: The confidence map is used for representing confidence levels of pixel points in an original image frame during feature fusion. Values of the confidence levels in the confidence map are between 0 and 1. For example, a confidence level corresponding to a pixel point in the confidence map is 0.9, which means that the pixel point has a relatively high (e.g., 90%) confidence level during feature fusion, and a feature of the pixel point needs to be retained. On the contrary, if a confidence level corresponding to a pixel point is 0.1, it means that the pixel point has a relatively low confidence level (e.g., 10%) during feature fusion, and a feature of the pixel point is not used. In the embodiments of this application, the feature fusion is guided by using the confidence map, and credibility supervision can be performed at the pixel level, to explicitly guide a neural network to learn from image features of high-quality frames, thereby restoring higher-quality images.

2) Artificial Intelligence (AI): It is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, to enable the machines to have functions of perception, reasoning, and decision-making. Basic AI technologies generally include technologies such as sensor, dedicated AI chip, cloud computing, distributed storage, a big data processing technology, operation/interaction system, and mechatronics. AI software technologies mainly include several major directions such as a computer vision (CV) technology, a speech processing technology, a natural language processing technology, and machine learning/deep learning. The embodiments of this application mainly relate to the field of machine learning technologies in the field of AI technologies.

In the related art, in the process of using deep learning to improve image quality, supervised learning is generally performed on the image processing model based on a difference loss between a predicted image and a real image, so that the predicted image restored by the image processing model can be closer to the real image.

Apparently, in the related art, a network is guided to learn image features only by comparing the difference between the predicted image and the real image. That is, credibility supervision is provided only at the image level, and the function of pixel points in the image in the image processing process is ignored, resulting in poor image processing quality.

In the image processing method described in the embodiments of this application, by introducing a confidence map in the image processing process, reliability supervision can be performed at the pixel level in the model training process, to explicitly guide a neural network to learn features of high-quality frames, thereby obtaining higher-quality images. The application scenarios of the image processing method include, but are not limited to: an image (video) super-resolution scenario, an image (video) dehazing scenario, an image (video) deraining scenario, an image (video) deblurring scenario, and/or an image (video) restoration scenario. The image dehazing scenario is used as an example. For a video captured in foggy or hazy weather, to process it into a high-quality video, that is, to remove the occlusion of objects by the fog or haze in the video, the video with fog or haze may be first divided into different original image sequences according to timestamps. Image preprocessing, that is, image feature extraction and confidence level estimation, is performed on each original image sequence to obtain a confidence map sequence and a feature map sequence corresponding to the original image sequence. In addition, feature fusion is performed under the guidance of the confidence map sequence, to generate a target feature map with high-quality image features corresponding to a target original image frame, and then a high-quality target image is restored based on the target feature map. By using the image processing method of this application, a confidence map is used to perform feature fusion, which can not only ensure the high-definition features in the original images, but also successfully remove the fog or haze in the images, to obtain a high-quality restored video.

This application provides an image processing algorithm or an image processing model, and the image processing model may be deployed on a cloud platform or a cloud server, or may be deployed on a mobile terminal, for example, a smart phone or a tablet computer. In an embodiment when the model is deployed on a mobile terminal, the computational cost of the image processing model can be reduced by using the existing model compression algorithm. The method involved in this application includes a model application stage and a model training stage, which may be executed in the same computer device or in different computer devices.

In an embodiment, a server on which a neural network model (image processing model) is deployed may be a node in a distributed system. The distributed system may be a blockchain system. The blockchain system may be a distributed system formed by the plurality of nodes connected in the form of network communication. A peer to peer (P2P) network may be formed between the nodes. A computing device in any form, for example, an electronic device such as a server or a terminal, may become a node in the blockchain system by joining the P2P network. The nodes include a hardware layer, an intermediate layer, an operating system layer, and an application layer. During model training, the training samples of the image processing model may be saved on a blockchain.

FIG. 1 is a flowchart of an image processing method according to an exemplary embodiment of this application. In this embodiment, an exemplary description is made by using an example in which the method is performed by a computer device. The method includes the following steps:

Step 101: Acquire an original image sequence, the original image sequence including at least three original image frames.

In an embodiment, the image processing method used in this embodiment of this application adopts a multi-frame fusion technology. That is, image features of a plurality of consecutive frames are fused to obtain a higher-quality target image frame through reconstruction. The plurality of consecutive frames generally refer to a plurality of image frames of which acquisition time points (timestamps) are consecutive. For example, by performing image processing on five consecutive original image frames, a target image frame corresponding to the third original image frame can be generated.

In an implementation, when a high-quality video corresponding to a low-quality video needs to be reconstructed, the original image frame corresponding to each timestamp may be first used as a center to construct an original image sequence including at least three original image frames. For example, the original image sequence may include an odd number of original image frames, or may include an even number of original image frames.

Step 102: Perform image preprocessing on the original image sequence to obtain a feature map sequence and a confidence map sequence that are corresponding to the original image sequence. The feature map sequence is a sequence of feature maps obtained by performing feature extraction on all of the original image frames. The confidence map sequence includes confidence maps corresponding to all of the original image frames, the confidence map corresponding to each of the original image frames being used for representing confidence levels of pixel points in each of the original image frames during feature fusion. Herein, the confidence map corresponding to one original image frame may also be considered as confidence levels of feature values in the feature map corresponding to the original image frame.

In the process of multi-frame fusion, the level of feature quality corresponding to the image features for feature fusion directly affects the image quality of the target reconstructed image frame after image reconstruction. For example, if the selected image features are low-quality features, relatively poor image quality of the target reconstructed image frame reconstructed based on the image features will obviously be caused. Therefore, in an implementation, before feature fusion is performed, image preprocessing first needs to be performed on the original image sequence to obtain a feature map sequence and a confidence map sequence that are corresponding to the original image sequence. The image preprocessing process may include two processes. One is to perform feature extraction on all of the original image frames to obtain a feature map sequence, the feature map sequence being used for subsequent feature alignment and feature fusion at the feature level. The second is to perform confidence level estimation on each original image frame, to estimate confidence levels of pixel points in each original image frame during feature fusion, to generate a confidence map sequence.

Step 103: Perform the feature fusion on the feature map sequence based on the confidence map sequence, to obtain a target fused feature map corresponding to a target original image frame in the original image sequence.

In some embodiments, the target original image frame is at the center of the original image sequence. For example, if the original image sequence includes an odd number of original image frames, the target original image frame is an original image frame at the center moment in the original image sequence. For example, if the original image sequence includes seven original image frames, the fourth original image frame is the target original image frame, that is, the image processing task in this embodiment is to reconstruct a high-quality image frame corresponding to the fourth original image frame based on the seven original image frames. In an embodiment, if the original image sequence includes an even number of original image frames, the target original image frame may be at least one of two original image frames near the center moment in the original image sequence. For example, if the original image sequence includes eight original image frames, the target original image frame may be the fourth original image frame, the fifth original image frame, or the fourth original image frame and the fifth original image frame.

In an implementation, after the feature map sequence and confidence map sequence obtained in the image preprocessing stage are obtained, because a confidence level of a certain pixel point included in the confidence map can represent a confidence level (credibility) of the pixel point during feature fusion, the confidence map may be used to guide the feature map for feature fusion based on confidence levels during the feature fusion. For example, image features with high confidence levels are retained to obtain the target fused feature map corresponding to the target original image frame.

In an embodiment, in step 103, for example, the feature fusion may be performed on the feature map sequence based on the confidence map sequence by using a feature fusion network, to obtain the target fused feature map corresponding to the target original image frame in the original image sequence. The feature fusion network is, for example, a deep neural network.

Step 104: Reconstruct the target original image frame based on the target fused feature map to obtain a target reconstructed image frame.

In an implementation, after the target fused feature map corresponding to the target original image frame is determined, image reconstruction may be performed based on the target fused feature map, to obtain a high-quality target reconstructed image frame. For example, in step 104, image reconstruction may be performed by using a reconstruction network. The reconstruction network is, for example, a deep neural network.

In an embodiment, the image processing method shown in this embodiment may be applied to scenarios such as image super-resolution (the definition of the target reconstructed image frame is higher than that of the target original image frame), image defogging (there is no fog occlusion on the target reconstructed image frame, or the range of fog occlusion is smaller than the target original image frame), image deraining, image dehazing, image deblurring, and/or image restoration.

Figure 2:
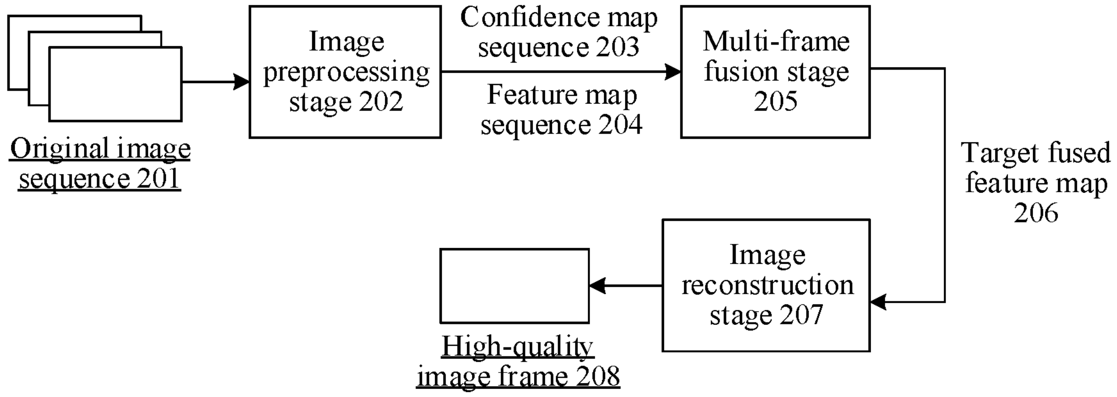
FIG. 2 is a schematic diagram of an image processing process according to an exemplary embodiment of this application.

FIG. 2 is a schematic diagram of an image processing process according to an exemplary embodiment of this application. The image processing process includes an image preprocessing stage 202, a multi-frame fusion stage 205, and an image reconstruction stage 207. For example, in the image preprocessing stage 202, feature extraction and confidence level estimation are performed on an original image sequence 201 to obtain a confidence map sequence 203 and a feature map sequence 204 corresponding to the original image sequence 201. In the multi-frame fusion stage 205, feature fusion at the image feature level is performed on the feature map sequence 204 based on the confidence map sequence 203, to obtain a target fused feature map 206 corresponding to the $t^{th}$ original image frame. In the image reconstruction stage 207, a high-quality image frame 208 corresponding to the $t^{th}$ original image frame is reconstructed based on the target fused feature map 206. The $t^{th}$ original image frame represents the target original image frame.

Based on the above, in this embodiment of this application, the confidence map corresponding to the original image frame is introduced in the image processing process. Because the confidence map can represent confidence levels of pixel points in the original image frame during feature fusion, reference may be made to the confidence levels corresponding to the pixel points for fusion during the feature fusion. For example, pixel point features with high confidence levels are retained, and credibility supervision at the pixel level is performed on the features in the feature fusion process to guide the fusion of image features with high credibility, so that the reconstructed target reconstructed image frame can retain high-definition image features in the original image frame, thereby improving the image quality of the reconstructed image.

During feature fusion, the image features in the target fused feature map have two feature sources. One is that the image features are obtained after feature extraction is performed on the target original image frame, that is, are from the target original image frame; the other is that the image features are obtained by fusing image features extracted from other adjacent original image frames, that is, are from other adjacent original image frames. To improve the feature quality of the target fused feature obtained through feature fusion (that is, to ensure that all the features fused are high-quality features as much as possible), when image features required for fusion are acquired through either of the two feature sources, the acquisition needs to be guided by a confidence map.

Figure 3:
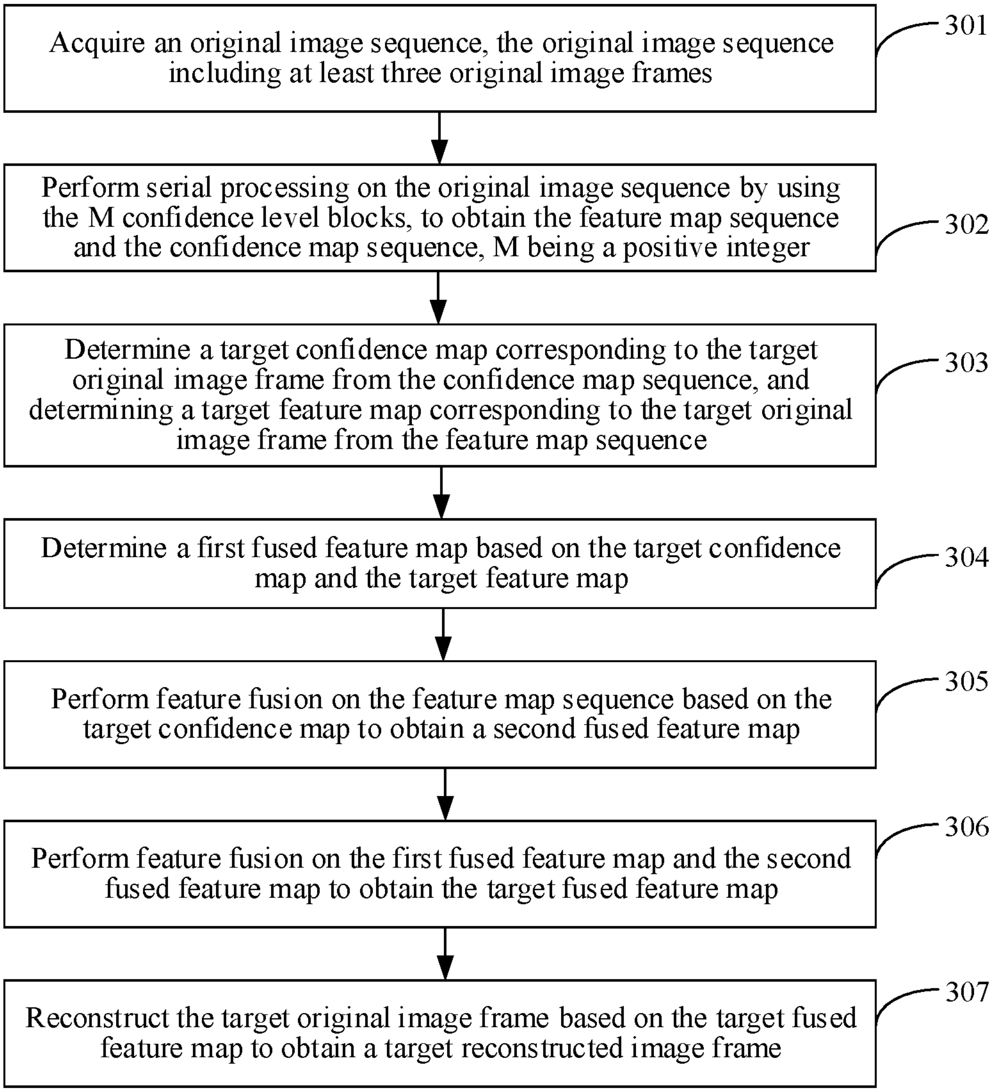
FIG. 3 is a flowchart of an image processing method according to another exemplary embodiment of this application.

In an illustrative example, FIG. 3 is a flowchart of an image processing method according to another exemplary embodiment of this application. An exemplary description is made by using an example in which the method is performed by a computer device. The method includes the following steps:

Step 301: Acquire an original image sequence, the original image sequence including at least three original image frames.

For the implementation of step 301, reference may be made to step 101, and details are not described again in this embodiment.

Step 302: Perform serial processing on the original image sequence by using the M confidence level blocks, to obtain the feature map sequence and the confidence map sequence, M being a positive integer.

In this embodiment, image preprocessing is performed on the original image sequence by using a pre-built and trained image preprocessing network. For the training process of the image preprocessing network, reference may be made to the following embodiments, and details are not described herein again in this embodiment. The image preprocessing network includes M confidence level blocks connected in series, and the M confidence level blocks connected in series perform feature extraction and confidence level estimation on each original image frame in the original image sequence.

In an embodiment, the value of M may be 1 or an integer greater than 1. To acquire image features at a deeper level, when building the image preprocessing network, more than one confidence level block may be connected in series to perform serial processing on the original image sequence. For example, the image preprocessing network includes three confidence level blocks connected in series.

In an illustrative example, Step 302 may further include step 302A to step 302C.

Step 302A: Input an $(i-1)^{th}$ feature map sequence and an $(i-1)^{th}$ confidence map sequence into an $i^{th}$ confidence level block, to obtain an $i^{th}$ feature map sequence and an $i^{th}$ confidence map sequence that are outputted by the $i^{th}$ confidence level block, i being a positive integer less than M.

Because the confidence level blocks in the image preprocessing network are connected in series, correspondingly, the output of the $(i-1)^{th}$ confidence level block is the input of the $i^{th}$ confidence level block, and the output of the last confidence level block (that is, the $M^{th}$ confidence level block) is the output of the image preprocessing network. In an implementation, the $(i-1)^{th}$ feature map sequence and the $(i-1)^{th}$ confidence map sequence obtained through processing by the $(i-1)^{th}$ confidence level block are inputted into the $i^{th}$ confidence level block, and feature splicing and feature augmentation are performed on the $(i-1)^{th}$ feature map sequence and the $(i-1)^{th}$ confidence map sequence by the $i^{th}$ confidence level block, to obtain an $i^{th}$ feature map sequence and an $i^{th}$ confidence map sequence that are outputted by the $i^{th}$ confidence level block.

In an embodiment, when i is 1, the $i^{th}$ confidence level block corresponds to the first confidence level block in the image preprocessing network. The input of the first confidence level block is an initialized feature map sequence and an initialized confidence map sequence, where the initialized feature map sequence is obtained by initializing the original image sequence. For example, vectorized representation is performed on the original image frames included in the original image sequence, and then the obtained representations are inputted into the first confidence level block; and the confidence levels of initial confidence maps in an initial confidence map sequence are all initial values, and the initial values may all be All 0, or all be 1, or be preset by the developer.

In an embodiment, when i is greater than 1, the processing process of the feature map sequence and the confidence map sequence by the confidence level block is as follows: after the $(i-1)^{th}$ feature map sequence and the $(i-1)^{th}$ confidence map sequence are inputted into the $i^{th}$ confidence level block, splicing processing, that is, channel dimension combination, is first performed on the $(i-1)^{th}$ feature map sequence and the $(i-1)^{th}$ confidence map sequence, and then they are sent to an augmentation branch for feature augmentation, to obtain the $i^{th}$ confidence map sequence and the $(i-1)^{th}$ feature map sequence.

Step 302B: Determine an $M^{th}$ confidence map sequence outputted by an $M^{th}$ confidence level block as the confidence map sequence.

Because the image preprocessing network includes M confidence level blocks, and the M confidence level blocks are connected in series, the output of the image preprocessing network is correspondingly the output of the $M^{th}$ confidence level block, that is, the $M^{th}$ confidence map sequence outputted by the $M^{th}$ confidence level block is determined as the confidence map sequence required for the feature fusion steps.

Step 302C: Determine an $M^{th}$ feature map sequence outputted by the $M^{th}$ confidence level block as the feature map sequence.

Correspondingly, the $M^{th}$ feature map sequence outputted by the $M^{th}$ confidence level block is determined as the feature map sequence required for the feature fusion steps.

Figure 4:
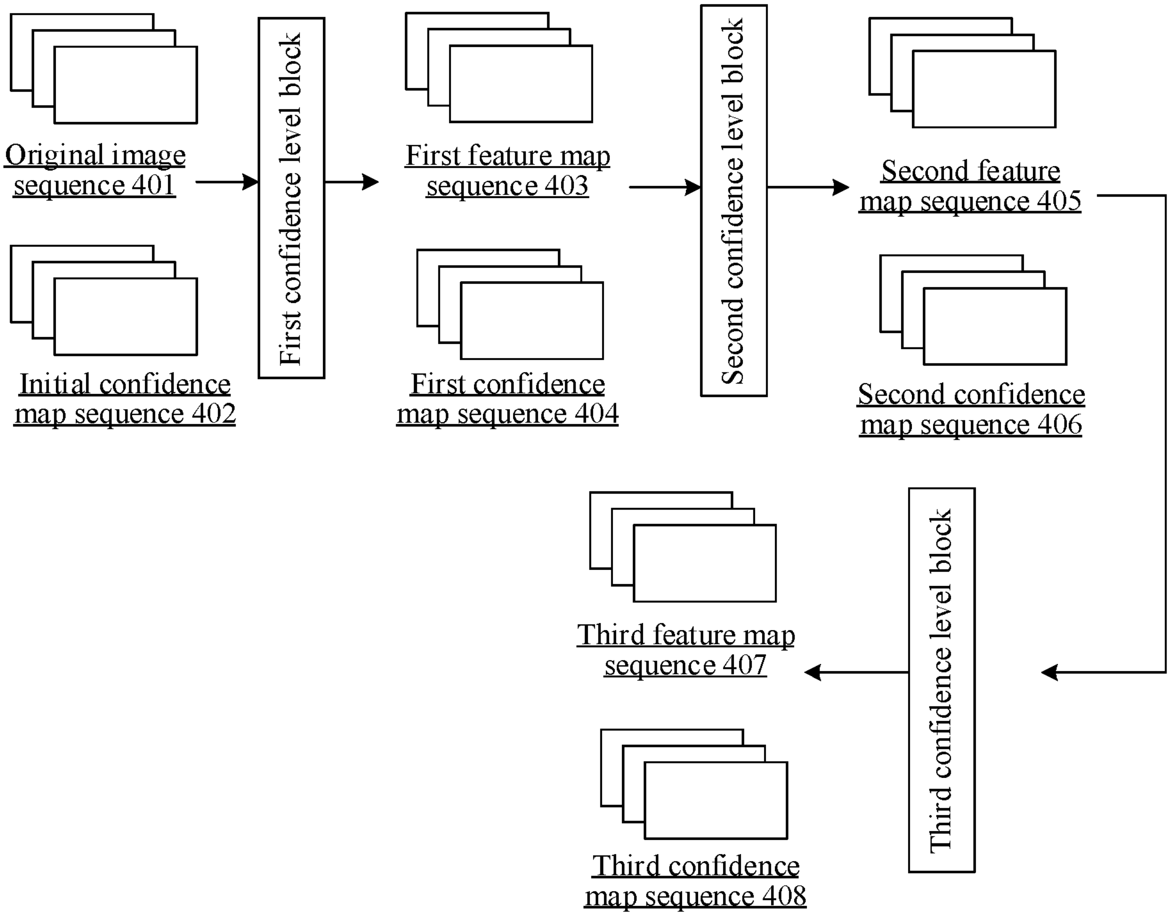
FIG. 4 is a schematic diagram of an image preprocessing process according to an exemplary embodiment of this application.

FIG. 4 is a schematic diagram of an image preprocessing process according to an exemplary embodiment of this application. An example in which the image preprocessing network includes three confidence level blocks is used. An original image sequence 401 and an initial confidence map sequence 402 are input into the first confidence level block. A first feature map sequence 403 and a first confidence map sequence 404 are output by the first confidence level block. Then, the first feature map sequence 403 and the first confidence map sequence 404 are input into the second confidence level block to obtain a second feature map sequence 405 and a second confidence map sequence 406. The second feature map sequence 405 and the second confidence map sequence 406 are then input into the third confidence level block, to obtain a third feature map sequence 407 and a third confidence map sequence 408 outputted by the third confidence level block.

Step 303: Determine a target confidence map corresponding to the target original image frame from the confidence map sequence, and determining a target feature map corresponding to the target original image frame from the feature map sequence.

Because this embodiment of this application is for reconstructing a high-quality image corresponding to the target original image frame, the purpose of feature fusion shall be that: high-definition features (image features with relatively high confidence levels) corresponding to the target original image frame are retained, and high-definition features (image features with relatively low confidence levels) that the target original image frame does not have are obtained by performing feature fusion on adjacent original image frames. Therefore, during feature fusion, a target confidence map corresponding to the target original image frame is acquired from the confidence map sequence, and the target confidence map provides a confidence level guidance basis for feature fusion; and a target feature map corresponding to the target original image frame is acquired from the feature map sequence, and the target feature map provides high-quality image features that the target original image frame originally has.

Step 304: Determine a first fused feature map based on the target confidence map and the target feature map.

In an implementation, to retain the high-quality image features in the target original image frame, feature processing is performed on the target feature map by using the target confidence map. Because the target confidence map indicates the confidence level of each pixel point in the target original image frame, in the process of feature processing, feature processing is performed on each pixel feature according to the confidence level corresponding to each pixel point, to screen the image features with relatively high confidence levels in the target original image frame, to obtain the first fused feature map. In an embodiment, confidence levels of pixel points in the target confidence map are multiplied by feature values of the corresponding pixel points in the target feature map respectively, to obtain the first fused feature map.

Step 305: Perform feature fusion on the feature map sequence based on the target confidence map to obtain a second fused feature map.

Because some of the features in the target fused feature map are from adjacent original image frames, in the process of feature fusion, feature fusion also needs to be performed on the feature map sequence by using the target confidence map, to extract redundant image features required for feature fusion, that is, to generate a second fused feature.

During actual application, step 304 may be performed first and then step 305 may be performed, or step 305 may be performed first and then step 304 may be performed, or step 304 and step 305 may be performed simultaneously. The order in which step 304 and step 305 are executed is not limited in this embodiment of this application.

Adjacent original image frames in the original image sequence formed by consecutive pictures often include the same background and the same moving object, and the difference between the adjacent original image frames is often only a slight difference of the spatial position of the moving object. Therefore, the part with the same inter-frame information is temporal redundancy information. In addition, the values of adjacent pixel points in the same original image frame are often similar or the same, which also produces spatial redundancy information. The spatial redundancy information and the temporal redundancy information are required in the feature fusion process. Therefore, the process of fusing the image features corresponding to the adjacent original image frames is the process of extracting the redundant image features corresponding to the original image frames.

In an illustrative example, step 305 may further include step 305A to step 305C.

Step 305A: Perform redundant feature extraction and feature fusion on the feature map sequence to obtain a third fused feature map, the third fused feature map being fused with redundant image features corresponding to all of the original image frames.

In an implementation, by performing a convolve-reshape-convolve (Cony-Reshape-Cony) operation on the feature map sequence, the redundant image features of all of the original image frames in the original image sequence are extracted, and the redundant image features (redundant spatial features+redundant temporal features) corresponding to all of the original image frames are fused to generate a third fused feature map, thereby being used to subsequently generate a target fused feature map corresponding to the target original image frame.

Step 305B: Determine a target reverse confidence map based on the target confidence map, a sum of a confidence level in the target confidence map and a confidence level in the target reverse confidence map for a same pixel point being 1. In other words, the confidence level of a pixel point in the target reverse confidence map is a difference between 1 and the confidence level of the pixel point in the target confidence map.

Because the first fused feature map has retained the high-quality features corresponding to the target original image frame, the high-quality features that the target original image frame does not have need to be acquired from the adjacent original image frames. In an implementation, to extract the image features corresponding to such pixel points from the third fused feature map, the target confidence map needs to be processed first, that is, the confidence level corresponding to each pixel point is subtracted from 1 to obtain the target reverse confidence map. The pixel points with high confidence levels in the target reverse confidence map are high-quality features that need to be acquired from the third fused feature map.

Step 305C: Determine the second fused feature map based on the target reverse confidence map and the third fused feature map.

Based on the relationship between the target reverse confidence map and the target confidence map, the type of pixel points with high confidence levels in the pixel points in the target original image frame during feature fusion have low confidence levels in the target reverse confidence map, while the type of pixel points with low confidence levels in the pixel points in the target original image frame during feature fusion have high confidence levels in the target reverse confidence map. Therefore, in the process of performing feature processing on the third fused feature map based on the target reverse confidence map, high-quality image features that the target original image frame does not have can be obtained based on the principle of selecting image features with high confidence levels.

In an embodiment, confidence levels of pixel points in the target reverse confidence map are multiplied by feature values of the corresponding pixel points in the third fused feature map respectively, to obtain the second fused feature map.

Step 306: Perform feature fusion on the first fused feature map and the second fused feature map to obtain the target fused feature map.

Because the first fused feature map retains the features with high confidence levels in the target original image frame, the features with low confidence levels in the target original image frame are provided by the second fused feature map fused with the temporal redundant features and the spatial redundant features corresponding to the original image frames. Therefore, if the target fused feature map corresponding to the target original image frame needs to be acquired, feature fusion only needs to be performed on the first fused feature and the second fused feature.

In an illustrative example, the foregoing feature fusion process may be expressed by the following formula:

$$F_t^{Fused} = F_t \times C_t + \phi_\theta(F_{[t-N:t+N]}) \times (1 - C_t)$$

where $$F_t^{Fused}$$

represents the target fused feature map corresponding to the target original image frame, $F_t$ represents the target feature map corresponding to the target original image frame, $C_t$ represents the target confidence map corresponding to the target original image frame, $F_{[t-N:t+N]}$ represents the feature map sequence obtained after image preprocessing is performed on the original image sequence, $1-C_t$ represents the target reverse confidence map, $\phi_\theta(F_{[t-N:t+N]})$ represents performing a Conv-Reshape-Conv operation on the feature map sequence to extract redundant image features in the original image sequence.

In an embodiment, $F_t \times C_t$ implements multiplying confidence levels of pixel points in the target confidence map by feature values of the corresponding pixel points in the target feature map respectively, to obtain the first fused feature map. $\phi_\theta(F_{[t-N:t+N]}) \times (1-C_t)$ implements multiplying confidence levels of pixel points in the target reverse confidence map by feature values of the corresponding pixel points in the third fused feature map respectively, to obtain the second fused feature map.

$$F_t^{Fused}$$

is the target fused feature map obtained by adding the first fused feature map and the second fused feature map. Specifically, by adding feature values in the first fused feature map and feature values at the corresponding positions in the second fused feature map, the target fused feature map can be obtained. Specifically, by adding feature values in the first fused feature map and feature values in the second fused feature map for the same pixel points, the target fused feature map can be obtained.

Figure 5:
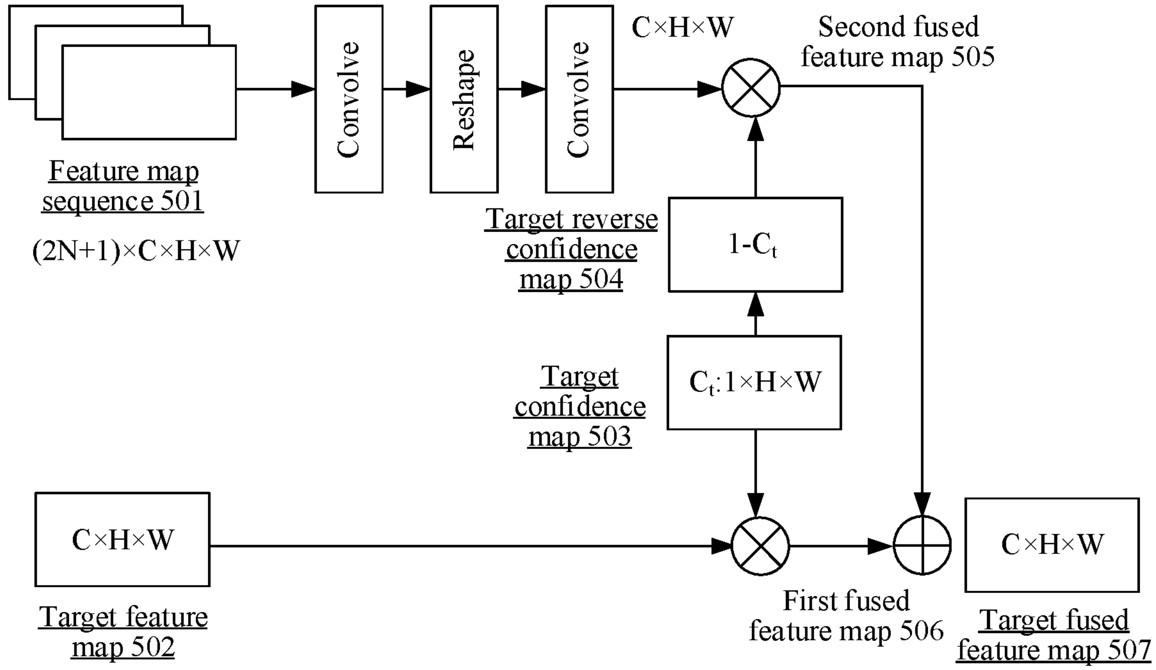
FIG. 5 is a schematic diagram of a process of feature fusion according to an exemplary embodiment of this application.

FIG. 5 is a schematic diagram of a process of feature fusion according to an exemplary embodiment of this application. For example, the feature fusion process guided by the confidence map is: performing a Convolve-Reshape-Convolve operation on the feature map sequence 501 (the feature map sequence 501 includes 2N+1 frames of feature maps, the number of channels corresponding to each feature map is C, the width of the feature map is W, and the height of the feature map is H), to extract the redundant image features of all of the original image frames, and generating the third fused feature map (not shown in the figure); performing feature processing on the third fused feature map based on a target reverse confidence map 504 to obtain a second fused feature map 505; and performing feature processing on a target feature map 502 based on a target confidence map 503 (the quantity of channels of the target confidence map is 1), to obtain a first fused feature map 506, and then performing feature fusion on the first fused feature map 506 and the second fused feature map 505 to generate a target fused feature map 507 corresponding to the target original image frame.

Step 307: Reconstruct the target original image frame based on the target fused feature map to obtain a target reconstructed image frame.

For the implementation of step 307, reference may be made to step 104, and details are not described again in this embodiment.

In this embodiment, feature extraction, feature augmentation, and confidence level estimation are performed on the original image sequence by using M confidence level blocks, to obtain a feature map sequence and a confidence map sequence for subsequent feature fusion; and by introducing the target confidence map corresponding to the target original image frame in the feature fusion stage, the image features with high confidence levels in the target original image frame can be retained during feature fusion, and the image features with low confidence levels in the target original image frame can be provided by the adjacent original image frames (that is, the original image sequence including the target original image frame), so that the target fused feature map obtained through the feature fusion can have more image features with high confidence levels, thereby improving the image quality of the image reconstruction result.

Figure 6:
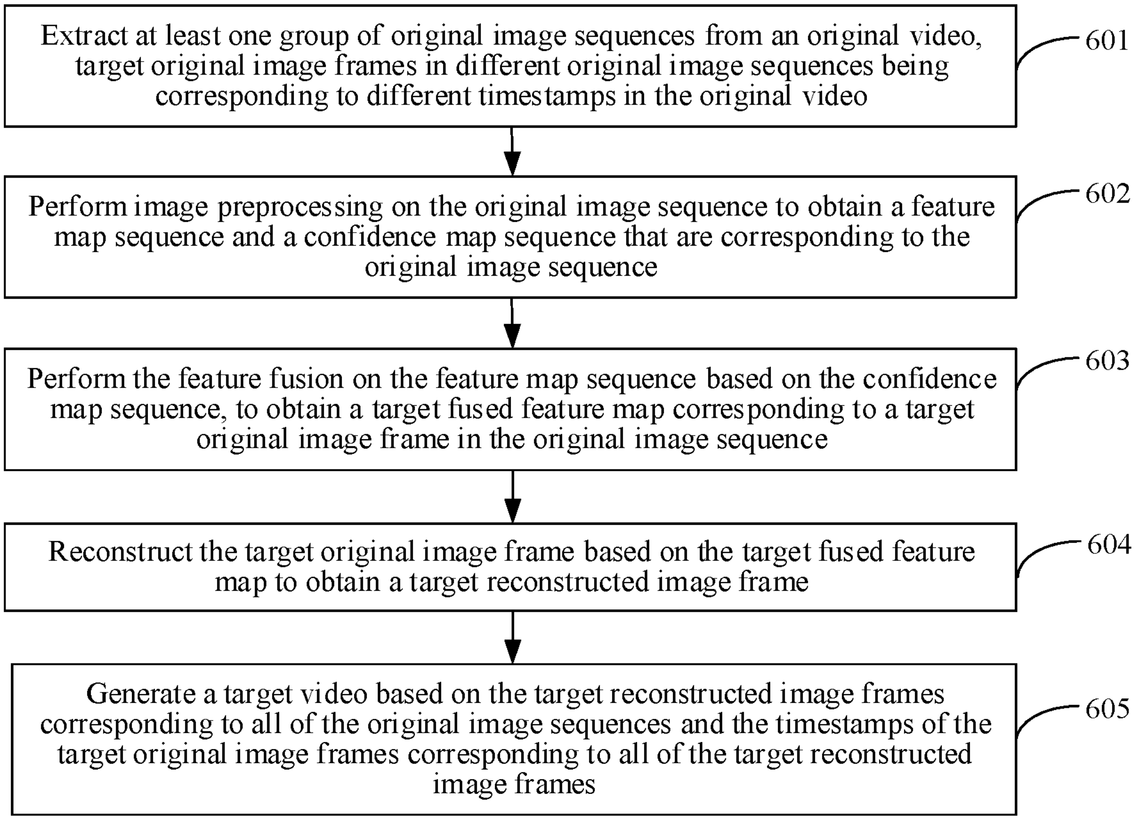
FIG. 6 is a flowchart of an image processing method according to another exemplary embodiment of this application.

In an application scenario, the foregoing image processing method may be applied to a video processing process, for example, processing a low-quality video into a high-quality video. For example, FIG. 6 is a flowchart of an image processing method according to another exemplary embodiment of this application. The method includes the following steps:

Step 601: Extract at least one group of original image sequences from an original video, target original image frames in different original image sequences being corresponding to different timestamps in the original video.

The original video is also formed by a plurality of image frames. To restore a low-quality video to a high-quality video, the original video may be split into different original image sequences based on timestamps. By performing the image processing method shown in the foregoing embodiment on each original image sequence, the target reconstructed image frame corresponding to the target original image frame in each original image sequence is obtained. The target reconstructed image frames are then arranged based on the timestamps, and a restored high-quality video can be obtained.

When the original video is split into different original image sequences according to the timestamps, the original image sequence may include an odd number of original image frames or an even number of original image frames.

Step 602: Perform image preprocessing on the original image sequence to obtain a feature map sequence and a confidence map sequence that are corresponding to the original image sequence.

Step 603: Perform the feature fusion on the feature map sequence based on the confidence map sequence, to obtain a target fused feature map corresponding to a target original image frame in the original image sequence.

Step 604: Reconstruct the target original image frame based on the target fused feature map to obtain a target reconstructed image frame.

In an embodiment, when the original image sequence includes an even number of original image frames, if the target original image frame includes two original image frames, the target reconstructed image frames corresponding to the two original image frames are reconstructed respectively.

For the implementation of step 602 to step 604, reference may be made to the foregoing embodiment, and details are not described herein again in this embodiment.

Step 605: Generate a target video based on the target reconstructed image frames corresponding to all of the original image sequences and the timestamps of the target original image frames corresponding to all of the target reconstructed image frames.

In an implementation, after acquiring the target reconstructed image frames corresponding to the target original image frames in all of the original image sequences, sorting may be performed according to the timestamps of the target original image frames in the original video, thereby generating a high-quality target video.

In this embodiment, by preprocessing the original video, that is, obtaining different original image sequences through splitting for different timestamps, and then performing the foregoing image processing method on all of the original image sequences, the low-quality original video can be restored to a high-quality target video.

To realize the image preprocessing process in the foregoing embodiment, a neural network needs to be built in advance, and supervised training needs to be performed on the neural network, so that the neural network can have the function of accurately estimating the confidence map corresponding to each original image frame. This embodiment focuses on describing the training process of the image preprocessing network.

Figure 7:
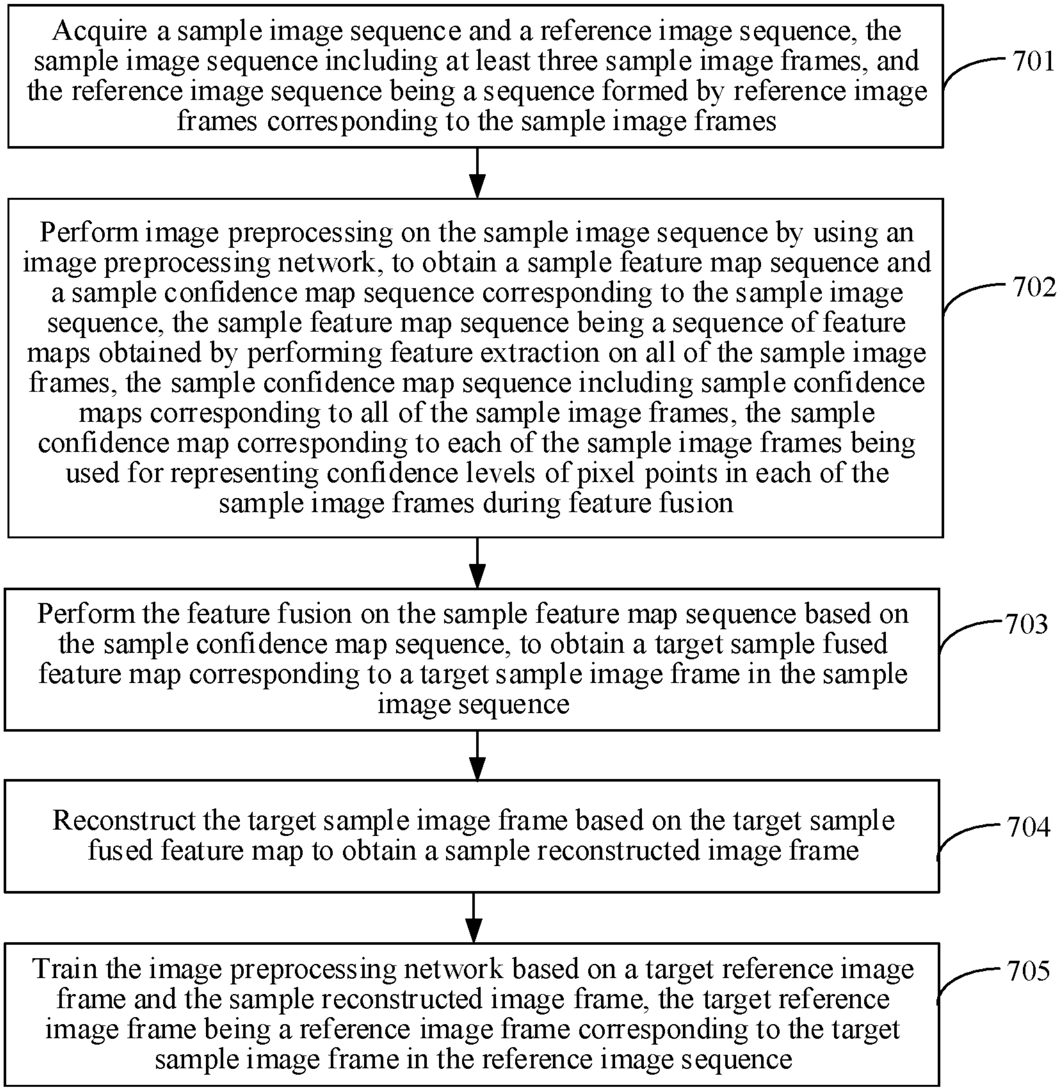
FIG. 7 is a flowchart of an image processing method according to an exemplary embodiment of this application.

FIG. 7 is a flowchart of an image processing method according to an exemplary embodiment of this application. In this embodiment, an exemplary description is made by using an example in which the method is performed by a computer device. The method includes the following steps:

Step 701: Acquire a sample image sequence and a reference image sequence. The sample image sequence includes at least three sample image frames, and the reference image sequence is a sequence formed by reference image frames corresponding to the sample image frames.

To supervise the training results of the image preprocessing network, a sample image sequence and a reference image sequence need to be prepared in advance. The reference image sequence is used for providing the image preprocessing network with a calculation basis for an image reconstruction loss. In an implementation, the training sample set includes several image sequence pairs, and each image sequence pair includes a sample image sequence and a reference image sequence. The sample image sequence may include an odd number of sample image frames, or an even number of sample image frames. The quantity of reference image frames included in the reference image sequence is the same as the quantity of sample image frames included in the sample image sequence.

The reference image frames in the training process may be obtained by performing image processing on the sample image sequence by using other image quality improvement methods. In an embodiment, image quality reduction processing may alternatively be performed on high-quality images to obtain a sample image sequence. For example, blurring processing is performed on a high-definition video to obtain a low-quality video. The reference image sequence is extracted from the high-definition video, and the corresponding sample image sequence is extracted from the low-quality video. The acquisition methods of the sample image sequence and the reference image sequence are not limited in this application.

In an embodiment, because the image processing method in the foregoing embodiment may be applied to different application scenarios, such as image super-resolution, image deblurring, image defogging, image deraining, and/or image dehazing. To improve the image processing quality in different application scenarios, specific training samples may be used for different application scenarios respectively, so that the image processing model obtained by training can perform image processing functions in specific scenarios. For example, for the image defogging scenario, the sample image frames in the used training sample set are all images acquired under various foggy conditions.

Step 702: Perform image preprocessing on the sample image sequence by using an image preprocessing network, to obtain a sample feature map sequence and a sample confidence map sequence corresponding to the sample image sequence, the sample feature map sequence being a sequence of feature maps obtained by performing feature extraction on all of the sample image frames, the sample confidence map sequence including sample confidence maps corresponding to all of the sample image frames, the sample confidence map corresponding to each of the sample image frames being used for representing confidence levels of pixel points in each of the sample image frames during feature fusion.

Similar to the application process of the image processing method in the foregoing embodiment, in the training process, the sample image sequence is first input into the image preprocessing network, and the image preprocessing network performs feature extraction and confidence level estimation, to obtain the sample feature map sequence and the sample confidence map sequence that are corresponding to the sample image sequence for the subsequent feature fusion process at the feature level.

Step 703: Perform the feature fusion on the sample feature map sequence based on the sample confidence map sequence, to obtain a target sample fused feature map corresponding to a target sample image frame in the sample image sequence.

If the sample image sequence includes an odd number of sample image frames, the target sample image frame is a sample image frame at the center moment in the sample image sequence. For example, if the sample image sequence includes seven sample image frames, the fourth sample image frame is the target sample image frame. That is, the image processing task in this embodiment is to reconstruct a high-quality sample image frame corresponding to the fourth sample image frame based on the seven sample image frames. In an embodiment, if the sample image sequence includes an even number of sample image frames, the target sample image frame may be at least one of two sample image frames near the center moment in the sample image sequence. For example, if the sample image sequence includes eight sample image frames, the target sample image frame may be the fourth sample image frame, the fifth sample image frame, or the fourth sample image frame and the fifth sample image frame.

In an implementation, after the sample feature map sequence and sample confidence map sequence obtained in the image preprocessing stage are obtained, because a confidence level of a certain pixel point included in the sample confidence map can represent a confidence level (credibility) of the pixel point during feature fusion, the sample confidence map correspondingly guide the sample feature map for feature fusion based on confidence levels during the feature fusion, for example, retaining sample image features with high confidence levels, to obtain the target sample fused feature map corresponding to the target sample image frame.

Step 704: Reconstruct the target sample image frame based on the target sample fused feature map to obtain a sample reconstructed image frame.

In an implementation, after the target sample fused feature map corresponding to the target sample image frame is determined, image reconstruction may be performed based on the target sample fused feature map, thereby obtaining a high-quality sample reconstructed image frame.

In an embodiment, the process of performing image reconstruction based on the sample fused feature map may be performed by a reconstruction network. The reconstruction network may be a reconstruction network in a video restoration with enhanced deformable convolutional networks (EDVR) algorithm. That is, several residual blocks perform reconstruction on the target sample fused feature map after fusion. For example, the reconstruction network may include 60 residual blocks.

Step 705: Train the image preprocessing network based on a target reference image frame and the sample reconstructed image frame, the target reference image frame being a reference image frame corresponding to the target sample image frame in the reference image sequence.

In an implementation, the target reference image frame and the sample reconstructed image frame are compared for a difference (that is, an image reconstruction loss), and the difference is used as a loss of the image preprocessing network. In addition, a back-propagation algorithm is used to update parameters in the image preprocessing network, and training of the image preprocessing network is stopped when the image reconstruction loss indicated by the target reference image frame and the sample reconstructed image frame is the smallest, that is, it is determined that training of the image preprocessing network is completed.

Based on the above, in this embodiment of this application, by training the image preprocessing network, the image preprocessing network can have the functions of accurately extracting image features and accurately estimating image confidence levels. Therefore, in the application process, the confidence map corresponding to the original image frame is introduced in the image processing process, and because the confidence map can represent confidence levels of pixel points in the original image frame during feature fusion, reference may be made to the confidence levels corresponding to the pixel points for fusion during the feature fusion. For example, pixel point features with high confidence levels are retained. Credibility supervision at the pixel level is performed on the features in the feature fusion process to guide the fusion of image features with high credibility, so that the reconstructed target reconstructed image frame can retain high-definition image features in the original image frame, thereby improving the image quality of the reconstructed image.

It can be seen from the foregoing embodiment that in the process of multi-frame fusion, feature fusion processing needs to be respectively performed on the target feature map and the feature map sequence based on the target confidence map, and then the final target fused feature map is obtained by fusion based on the processing results. Therefore, similar to the application process, in the training process, feature fusion processing needs to be respectively performed on the target sample feature map and the sample feature map sequence based on the target sample confidence map corresponding to the target sample image frame.

Figure 8:
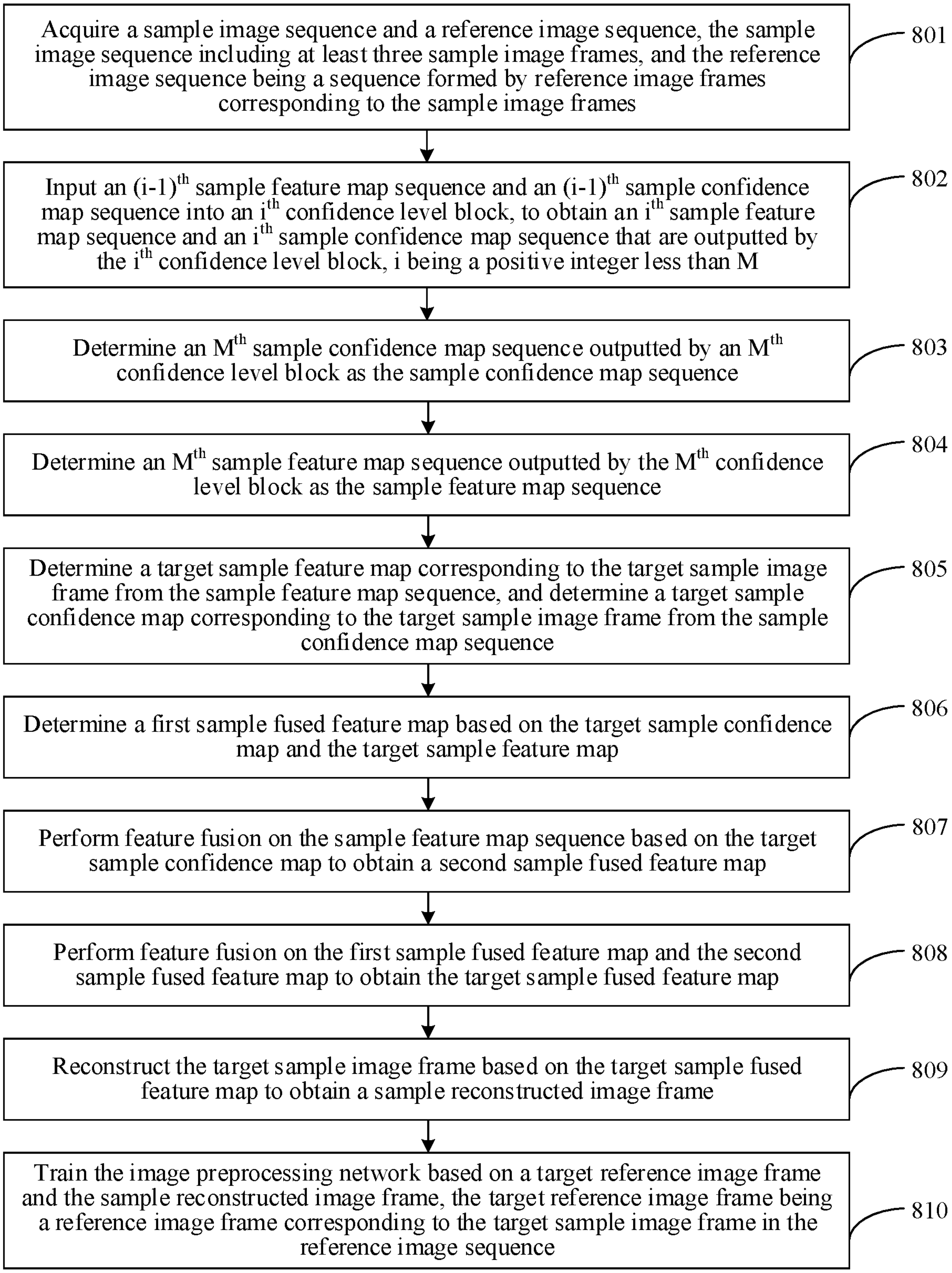
FIG. 8 is a flowchart of an image processing method according to another exemplary embodiment of this application.

FIG. 8 is a flowchart of an image processing method according to another exemplary embodiment of this application. The method includes the following steps:

Step 801: Acquire a sample image sequence and a reference image sequence, the sample image sequence including at least three sample image frames, and the reference image sequence being a sequence formed by reference image frames corresponding to the sample image frames.

For the implementation of step 801, reference may be made to the foregoing embodiments, and details are not described herein again in this embodiment.

Step 802: Input an $(i-1)^{th}$ sample feature map sequence and an $(i-1)^{th}$ sample confidence map sequence into an $i^{th}$ confidence level block, to obtain an $i^{th}$ sample feature map sequence and an $i^{th}$ sample confidence map sequence that are outputted by the $i^{th}$ confidence level block, i being a positive integer less than M.

The image preprocessing network includes M confidence level blocks, M being a positive integer.

Step 803: Determine an $M^{th}$ sample confidence map sequence output by an $M^{th}$ confidence level block as the sample confidence map sequence.

Step 804: Determine an $M^{th}$ sample feature map sequence output by the $M^{th}$ confidence level block as the sample feature map sequence.

Step 805: Determine a target sample feature map corresponding to the target sample image frame from the sample feature map sequence, and determine a target sample confidence map corresponding to the target sample image frame from the sample confidence map sequence.

Step 806: Determine a first sample fused feature map based on the target sample confidence map and the target sample feature map.

Step 807: Perform feature fusion on the sample feature map sequence based on the target sample confidence map to obtain a second sample fused feature map.

In an illustrative example, step 807 may include the following steps:

1. Perform redundant feature extraction and feature fusion on the sample feature map sequence to obtain a third sample fused feature map, the third sample fused feature map being fused with redundant image features corresponding to all of the sample image frames.
2. Determine a target sample reverse confidence map based on the target sample confidence map, a sum of a confidence level in the target sample confidence map and a confidence level in the target sample reverse confidence map for a same pixel point being 1.
3. Determine the second sample fused feature map based on the target sample reverse confidence map and the third sample fused feature map.

Step 808: Perform feature fusion on the first sample fused feature map and the second sample fused feature map to obtain the target sample fused feature map.

For the process for how to perform image preprocessing on the sample image sequence, and how to perform feature fusion on the sample feature map sequence based on the sample confidence map sequence in this embodiment, reference may be made to the process of performing image preprocessing on the original image sequence and how to perform feature fusion on the feature map sequence based on the confidence map sequence in the foregoing embodiment, and details are not described herein again in this embodiment.

Step 809: Reconstruct the target sample image frame based on the target sample fused feature map to obtain a sample reconstructed image frame.

Step 810: Train the image preprocessing network based on a target reference image frame and the sample reconstructed image frame, the target reference image frame being a reference image frame corresponding to the target sample image frame in the reference image sequence.

For the implementations of step 809 and step 810, reference may be made to the foregoing embodiments, and details are not described herein again in this embodiment.

In this embodiment, feature extraction, feature augmentation, and confidence level estimation are performed on the sample image sequence by using M confidence level blocks, to obtain the sample feature map sequence and the sample confidence map sequence for subsequent feature fusion. By introducing the target sample confidence map corresponding to the target sample image frame in the feature fusion stage, the image features with high confidence levels in the target sample image frame can be retained during the feature fusion, and the image features with low confidence levels in the target sample image frame can be provided by the adjacent sample image frames, so that the target sample fused feature map obtained through feature fusion can have more sample image features with high confidence levels, thereby improving the image quality of the image reconstruction result.

In the foregoing embodiment, only the image reconstruction loss is used to perform supervised training on the image preprocessing network. To supervise the network training at the pixel level, a confidence level estimation loss is introduced in the loss calculation process of the image preprocessing network. In another implementation, image pre-reconstruction is performed based on the sample feature map sequence and the sample confidence map sequence outputted by each confidence level block in the image preprocessing network, to obtain a sample reconstructed map sequence, and then supervision of the confidence level estimation loss is provided to the image preprocessing network based on the sample reconstructed map sequence and the reference image sequence, thereby further improving the image processing performance of the image preprocessing network.

Figure 9:
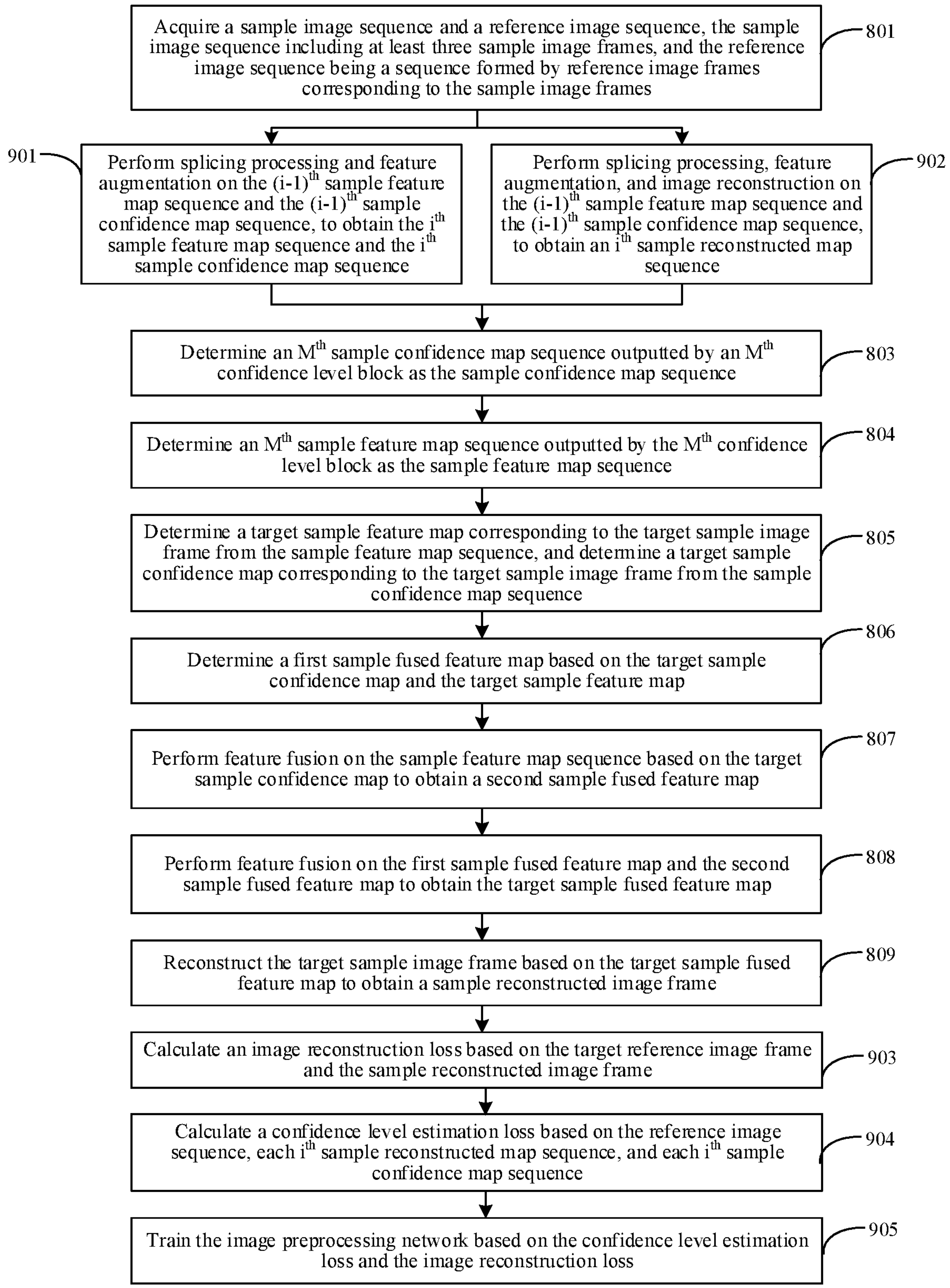
FIG. 9 is a flowchart of an image processing method according to another exemplary embodiment of this application.

Based on FIG. 8, as shown in FIG. 9, step 802 may include step 901, and step 810 may include step 903 to step 905. In addition, the image processing method in FIG. 8 may further include step 902.

Step 901: Perform splicing processing and feature augmentation on the $(i-1)^{th}$ sample feature map sequence and the $(i-1)^{th}$ sample confidence map sequence, to obtain the $i^{th}$ sample feature map sequence and the $i^{th}$ sample confidence map sequence.

In an implementation, the output of the $(i-1)^{th}$ confidence level block is the input of the $i^{th}$ confidence level block. That is, the $(i-1)^{th}$ sample feature map sequence and the $(i-1)^{th}$ sample confidence map sequence outputted by the $(i-1)^{th}$ confidence level block are inputted into the $i^{th}$ confidence level block. Splicing processing and feature augmentation processing are performed on the $(i-1)^{th}$ sample feature map sequence and the $(i-1)^{th}$ sample confidence map sequence, to obtain the $i^{th}$ sample feature map sequence and the $i^{th}$ sample confidence map sequence that are outputted by the $i^{th}$ confidence level block.

Step 902: Perform splicing processing, feature augmentation, and image reconstruction on the $(i-1)^{th}$ sample feature map sequence and the $(i-1)^{th}$ sample confidence map sequence, to obtain an $i^{th}$ sample reconstructed map sequence.

In an implementation, in addition to performing the feature extraction, the feature augmentation, and the confidence level estimation on the sample image sequence by using confidence level blocks, to supervise whether the confidence level estimation result is accurate during the training, splicing processing, feature augmentation, and image reconstruction are further performed on the $(i-1)^{th}$ sample feature map sequence and the $(i-1)^{th}$ sample confidence map sequence in the $i^{th}$ confidence level block, to reconstruct the sample reconstructed images corresponding to all of the sample image frames respectively, thereby forming the $i^{th}$ sample reconstructed map sequence.

The $i^{th}$ sample reconstructed map sequence is only used in the loss calculation process, and does not participate in the subsequent feature fusion process and image reconstruction process.

Figure 10:
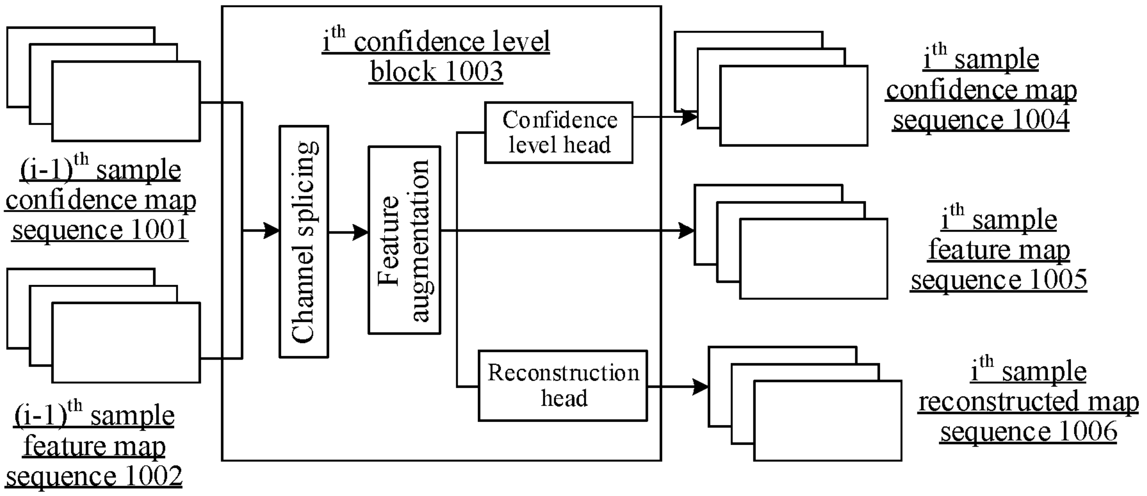
FIG. 10 is a schematic diagram of a confidence level block according to an exemplary embodiment of this application.

FIG. 10 is a schematic diagram of a confidence level block according to an exemplary embodiment of this application. The $(i-1)^{th}$ sample confidence map sequence 1001 and the $(i-1)^{th}$ sample feature map sequence 1002 are input into an $i^{th}$ confidence level block 1003. After channel splicing and feature augmentation, an $i^{th}$ sample feature map sequence 1005 is output. An $i^{th}$ sample confidence map sequence 1004 is output by a confidence level header and an $i^{th}$ sample reconstructed map sequence 1006 is output by a reconstruction head.

Step 903: Calculate an image reconstruction loss based on the target reference image frame and the sample reconstructed image frame.

In an illustrative example, a loss function of the image preprocessing network in this embodiment may be represented as:

$$L = L_d + \lambda_c L_c$$

where L is a total loss function of the image preprocessing network, $L_d$ represents the image reconstruction loss corresponding to the image preprocessing network, $L_c$ represents the confidence level estimation loss corresponding to the image preprocessing network, and $\lambda_c$ represents the weight between the image reconstruction loss and the confidence level estimation loss.

Correspondingly, in an implementation, during calculation the model loss, the image reconstruction loss is first calculated according to the target reference image frame and the sample reconstructed image frame, and the image preprocessing network is supervised at the image level.

Step 904: Calculate a confidence level estimation loss based on the reference image sequence, each $i^{th}$ sample reconstructed map sequence, and each $i^{th}$ sample confidence map sequence.

In an illustrative example, a calculation formula for the confidence level estimation loss may be represented as:

$$L_c = \frac{1}{M(2N+1)} \sum_{i=1}^{M} \sum_{n=-N}^{N} C_{t+n}^{i} \left(\hat{I}_{t+n}^{i} - J_{t+n}\right)^2 - \lambda_r \log C_{t+n}^{i}$$

where $L_c$ represents the confidence level estimation loss, M represents the quantity of confidence level blocks, 2N+1 represents the quantity of sample image frames included in each image sequence, i represents the order of confidence level blocks, $J_{t+n}$ represents each reference image frame in the reference image sequence, $$\hat{I}_{t+n}^{i}$$

identifies each sample reconstructed image in the sample reconstructed map sequence, $$C_{t+n}^{i}$$

represents the sample confidence map in the sample confidence map sequence, and $\lambda_r$ represents a weight. By minimizing the confidence level estimation loss, the preprocessing result (sample reconstructed image) of each confidence level block can be made closer to the real value (reference image frame).

In the process of calculating the confidence level estimation loss, to update the parameters of each confidence level block, an output loss of each confidence level block needs to be calculated, that is, the $i^{th}$ sample reconstructed map sequence and the $i^{th}$ sample confidence map sequence outputted by each confidence level block need to be acquired, so that M sample reconstructed map sequences and M sample confidence map sequences are used in the confidence level loss calculation process.

For example, if the image preprocessing network includes three confidence level blocks, in the process of calculating the confidence level estimation loss, the sample confidence map sequences (that is, including the first sample confidence map sequence, the second sample confidence map sequence and the third sample confidence map sequence) outputted by the three confidence level blocks respectively and the sample reconstructed map sequences (that is, including the first sample reconstructed map sequence, the second sample reconstructed map sequence and the third sample reconstructed map sequence) outputted by the three confidence level blocks respectively need to be acquired, and then the confidence level estimation loss is calculated based on the three sample reconstructed map sequences, the three sample confidence map sequences, and the reference map sequence.

Step 905: Train the image preprocessing network based on the confidence level estimation loss and the image reconstruction loss.

After the confidence level estimation loss and the image reconstruction loss are calculated, the image preprocessing network may be trained based on a sum of the foregoing two losses, and until the confidence level estimation loss reaches the minimum value, training of the image preprocessing network is completed.

In this embodiment, by adding the confidence level estimation loss to the model loss, the image processing process can not only be supervised at the image level, but also be supervised at the pixel level, so that the trained image preprocessing network can have the function of accurately estimating the confidence map, thereby further improving the image quality of subsequent reconstructed images.

Figure 11:
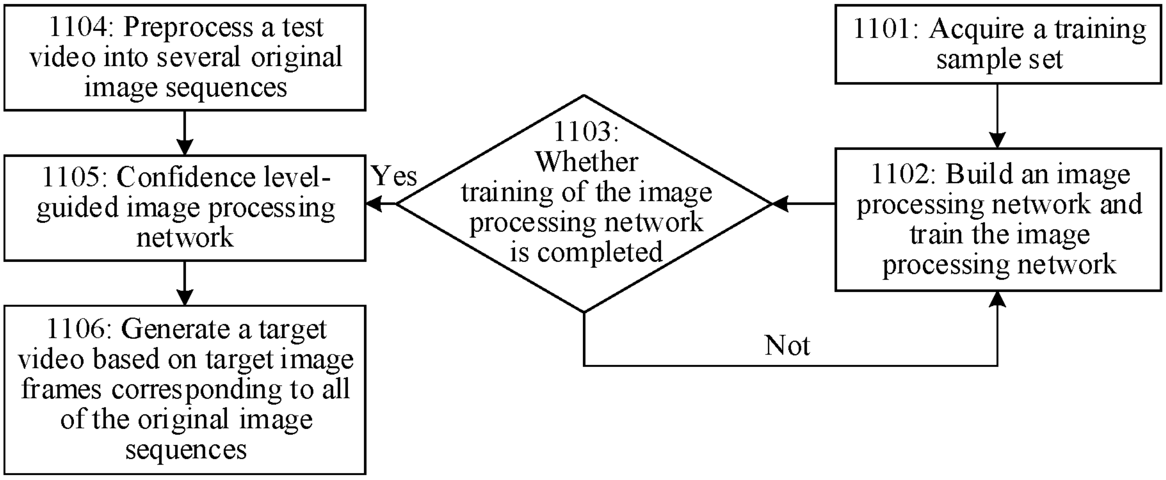
FIG. 11 is a block flowchart of a complete image processing process according to an exemplary embodiment of this application.

FIG. 11 is a block flowchart of a complete image processing process according to an exemplary embodiment of this application. The process includes the following steps:

Step 1101: Acquire a training sample set.

The training sample set is formed by several training sample pairs, and each training sample pair includes a sample image sequence and a reference image sequence.

Step 1102: Build an image processing network and train the image processing network.

The image processing network may include the image preprocessing network, the image feature fusion network (that is, the feature fusion process is also performed by a neural network), and the image reconstruction network in the foregoing embodiments.

Step 1103: Whether training of the image processing network is completed.

If the training of the image processing network is completed, step 1105 is performed to obtain a confidence level-guided image processing network, otherwise step 1102 is performed to continue to train the image processing network.

Step 1104: Preprocess a test video into several original image sequences.

Target original images in different original image sequences correspond to different timestamps in the test video.

Step 1105: Confidence level-guided image processing network.

Step 1106: Generate a target video based on target image frames corresponding to all of the original image sequences.

The following describes apparatus embodiments of this application. For details not described in detail in the apparatus embodiments, reference may be made to the foregoing method embodiments.

Figure 12:
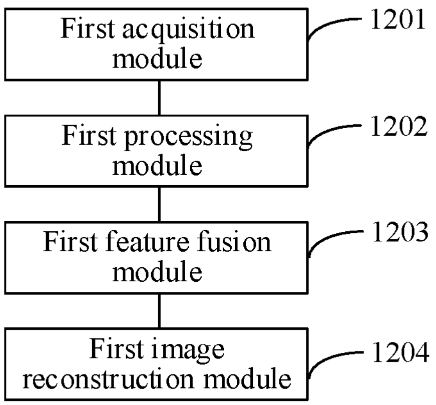
FIG. 12 is a structural block diagram of an image processing apparatus according to an exemplary embodiment of this application.

FIG. 12 is a structural block diagram of an image processing apparatus according to an exemplary embodiment of this application. The apparatus may further include:

- a first acquisition module 1201, configured to acquire an original image sequence, the original image sequence including at least three original image frames;
- a first processing module 1202, configured to perform image preprocessing on the original image sequence to obtain a feature map sequence and a confidence map sequence that are corresponding to the original image sequence, the feature map sequence being a sequence of feature maps obtained by performing feature extraction on all of the original image frames, the confidence map sequence including confidence maps corresponding to all of the original image frames, the confidence map corresponding to each of the original image frames being used for representing confidence levels of pixel points in each of the original image frames during feature fusion;
- a first feature fusion module 1203, configured to perform the feature fusion on the feature map sequence based on the confidence map sequence, to obtain a target fused feature map corresponding to a target original image frame in the original image sequence; and
- a first image reconstruction module 1204, configured to reconstruct the target original image frame based on the target fused feature map to obtain a target reconstructed image frame.

In an embodiment, the first feature fusion module 1203 includes:

- a first determining unit, configured to determine a target confidence map corresponding to the target original image frame from the confidence map sequence, and determine a target feature map corresponding to the target original image frame from the feature map sequence;

a second determining unit, configured to determine a first fused feature map based on the target confidence map and the target feature map;

a first feature fusion unit, configured to perform feature fusion on the feature map sequence based on the target confidence map to obtain a second fused feature map; and a second feature fusion unit, configured to perform feature fusion on the first fused feature map and the second fused feature map to obtain the target fused feature map.

In an embodiment, the first feature fusion unit is further configured to:

perform redundant feature extraction and feature fusion on the feature map sequence to obtain a third fused feature map, the third fused feature map being fused with redundant image features corresponding to all of the original image frames;

determine a target reverse confidence map based on the target confidence map, a sum of a confidence level in the target confidence map and a confidence level in the target reverse confidence map for a same pixel point being 1; and determine the second fused feature map based on the target reverse confidence map and the third fused feature map.

In an embodiment, the image preprocessing is performed on the original image sequence by using an image preprocessing network, and the image preprocessing network includes M confidence level blocks connected in series, M being a positive integer; and the first processing module 1202 includes:

a first processing unit, configured to perform serial processing on the original image sequence by using the M confidence level blocks, to obtain the feature map sequence and the confidence map sequence.

In an embodiment, the first processing unit is further configured to:

input an $(i-1)^{th}$ feature map sequence and an $(i-1)^{th}$ confidence map sequence into an $i^{th}$ confidence level block, to obtain an $i^{th}$ feature map sequence outputted by the $i^{th}$ confidence level block and an $i^{th}$ confidence map sequence outputted by the $i^{th}$ confidence level block, i being a positive integer less than M;

determine an $M^{th}$ confidence map sequence outputted by an $M^{th}$ confidence level block as the confidence map sequence; and determine an $M^{th}$ feature map sequence outputted by the $M^{th}$ confidence level block as the feature map sequence.

In an embodiment, the first processing unit is further configured to:

perform splicing processing and feature augmentation on the $(i-1)^{th}$ feature map sequence and the $(i-1)^{th}$ confidence map sequence, to obtain the $i^{th}$ feature map sequence and the $i^{th}$ confidence map sequence.

In an embodiment, the first acquisition module 1201 includes:

an extraction unit, configured to extract at least one group of original image sequences from an original video, target original image frames in different original image sequences being corresponding to different timestamps in the original video; and the apparatus further includes:

a generation module, configured to generate a target video based on the target reconstructed image frames corresponding to all of the original image sequences and the timestamps of the target original image frames corresponding to all of the target reconstructed image frames.

Based on the above, in this embodiment of this application, the confidence map corresponding to the original image frame is introduced in the image processing process, and because the confidence map can represent confidence levels of pixel points in the original image frame during feature fusion, reference may be made to the confidence levels corresponding to the pixel points for fusion during the feature fusion. For example, pixel point features with high confidence levels are retained, and credibility supervision at the pixel level is performed on the features in the feature fusion process to guide the fusion of image features with high credibility and reliability, so that the reconstructed target reconstructed image frame can retain high-definition image features in the original image frame, thereby improving the image quality of the reconstructed image.

Figure 13:
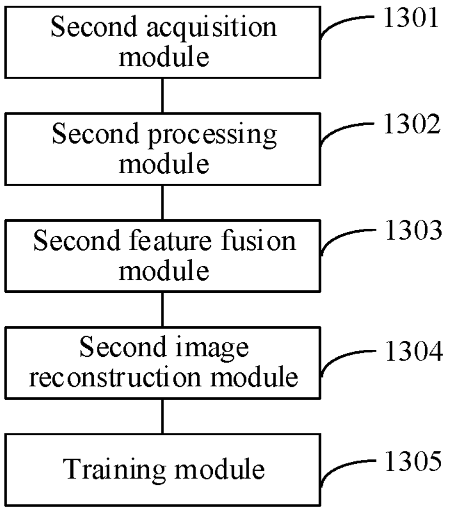
FIG. 13 is a structural block diagram of an image processing apparatus according to an exemplary embodiment of this application.

FIG. 13 is a structural block diagram of an image processing apparatus according to an exemplary embodiment of this application. The apparatus includes:

a second acquisition module 1301, configured to acquire a sample image sequence and a reference image sequence, the sample image sequence including at least three sample image frames, and the reference image sequence being a sequence formed by reference image frames corresponding to the sample image frames;

a second processing module 1302, configured to perform image preprocessing on the sample image sequence by using an image preprocessing network, to obtain a sample feature map sequence and a sample confidence map sequence corresponding to the sample image sequence, the sample feature map sequence being a sequence of feature maps obtained by performing feature extraction on all of the sample image frames, the sample confidence map sequence including sample confidence maps corresponding to all of the sample image frames, the sample confidence map corresponding to each of the sample image frames being used for representing confidence levels of pixel points in each of the sample image frames during feature fusion;

a second feature fusion module 1303, configured to perform the feature fusion on the sample feature map sequence based on the sample confidence map sequence, to obtain a target sample fused feature map corresponding to a target sample image frame in the sample image sequence; and a second image reconstruction module 1304, configured to reconstruct the target sample image frame based on the target sample fused feature map to obtain a sample reconstructed image frame; and a training module 1305, configured to train the image preprocessing network based on a target reference image frame and the sample reconstructed image frame, the target reference image frame being a reference image frame corresponding to the target sample image frame in the reference image sequence.

In an embodiment, the second feature fusion module 1303 includes:

a third determining unit, configured to determine a target sample feature map corresponding to the target sample image frame from the sample feature map sequence, and determine a target sample confidence map corresponding to the target sample image frame from the sample confidence map sequence;

a fourth determining unit, configured to determine a first sample fused feature map based on the target sample confidence map and the target sample feature map;

a third feature fusion unit, configured to perform feature fusion on the sample feature map sequence based on the target sample confidence map to obtain a second sample fused feature map; and a fourth feature fusion unit, configured to perform feature fusion on the first sa1mple fused feature map and the second sample fused feature map to obtain the target sample fused feature map.

In an embodiment, the third feature fusion unit is further configured to:

perform redundant feature extraction and feature fusion on the sample feature map sequence to obtain a third sample fused feature map, the third sample fused feature map being fused with redundant image features corresponding to all of the sample image frames;

determine a target sample reverse confidence map based on the target sample confidence map, a sum of a confidence level in the target sample confidence map and a confidence level in the target sample reverse confidence map for a same pixel point being 1; and determine the second sample fused feature map based on the target sample reverse confidence map and the third sample fused feature map.

In an embodiment, the image preprocessing network includes M confidence level blocks, M being a positive integer; and the second processing module includes:

a second processing unit, configured to input an $(i-1)^{th}$ sample feature map sequence and an $(i-1)^{th}$ sample confidence map sequence into an $i^{th}$ confidence level block, to obtain an $i^{th}$ sample feature map sequence and an $i^{th}$ sample confidence map sequence that are outputted by the $i^{th}$ confidence level block, i being a positive integer less than M;

a fifth determining unit, configured to determine an $M^{th}$ sample confidence map sequence outputted by an $M^{th}$ confidence level block as the sample confidence map sequence; and a sixth determining unit, configured to determine an $M^{th}$ sample feature map sequence outputted by the $M^{th}$ confidence level block as the sample feature map sequence.

In an embodiment, the second processing unit is further configured to:

perform splicing processing and feature augmentation on the $(i-1)^{th}$ sample feature map sequence and the $(i-1)^{th}$ sample confidence map sequence, to obtain the $i^{th}$ sample feature map sequence and the $i^{th}$ sample confidence map sequence; and perform splicing processing, feature augmentation, and image reconstruction on the $(i-1)^{th}$ sample feature map sequence and the $(i-1)^{th}$ sample confidence map sequence, to obtain an $i^{th}$ sample reconstructed map sequence.

In an embodiment, the training module 1305 includes:

a first calculation unit, configured to calculate an image reconstruction loss based on the target reference image frame and the sample reconstructed image frame;

a second calculation unit, configured to calculate a confidence level estimation loss based on the reference image sequence, each $i^{th}$ sample reconstructed map sequence, and each $i^{th}$ sample confidence map sequence; and a training unit, configured to train the image preprocessing network based on the confidence level estimation loss and the image reconstruction loss.

Based on the above, in this embodiment of this application, by training the image preprocessing network, the image preprocessing network can have the functions of accurately extracting image features and accurately estimating image confidence levels. Therefore, in the application process, the confidence map corresponding to the original image frame is introduced in the image processing process, and because the confidence map can represent confidence levels of pixel points in the original image frame during feature fusion, reference may be made to the confidence levels corresponding to the pixel points for fusion during the feature fusion. For example, pixel point features with high confidence levels are retained, and credibility supervision at the pixel level is performed on the features in the feature fusion process to guide the fusion of image features with high credibility, so that the reconstructed target reconstructed image frame can retain high-definition image features in the original image frame, thereby improving the image quality of the reconstructed image.

Figure 14:
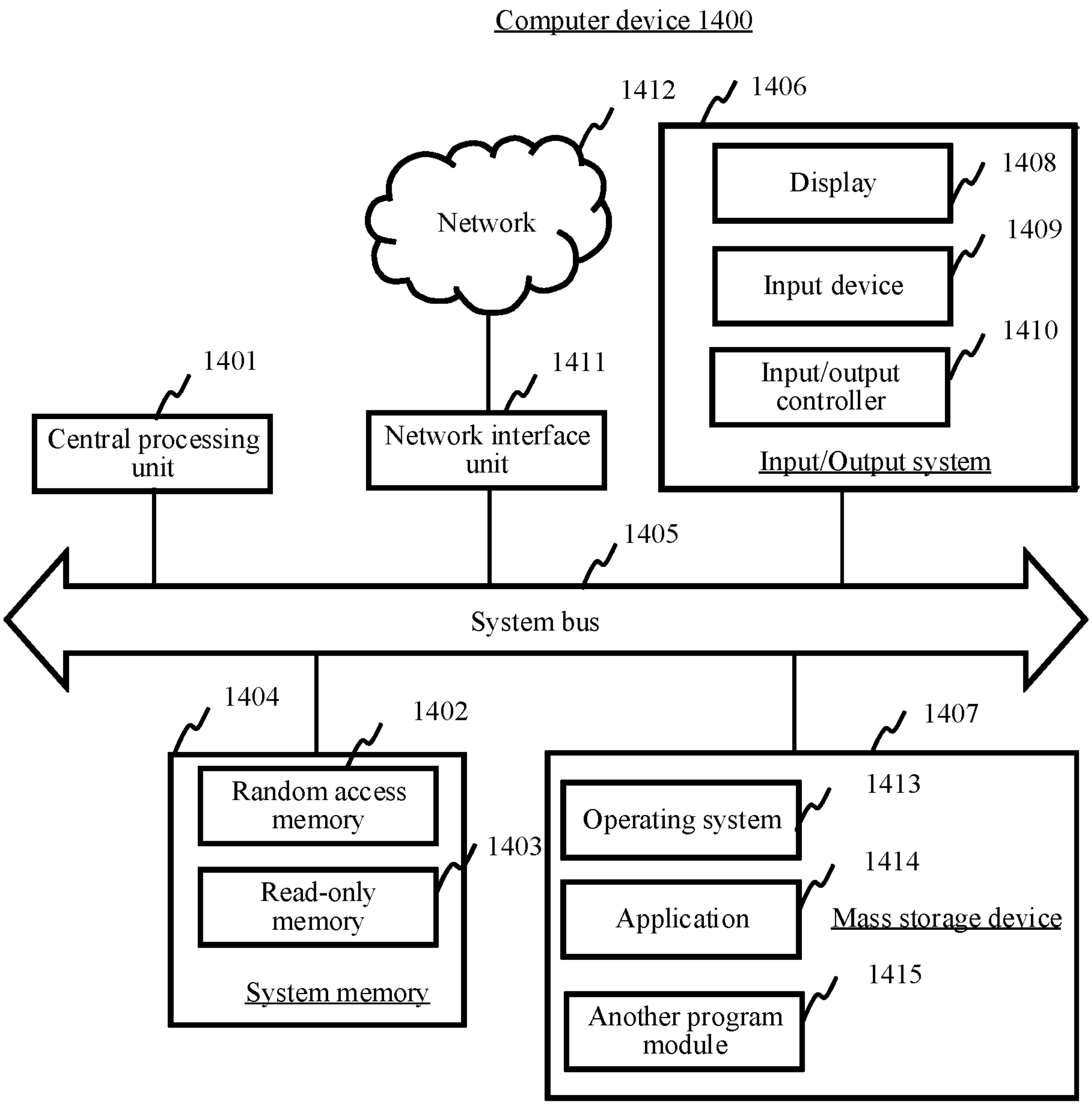
FIG. 14 is a schematic structural diagram of a computer device according to an embodiment of this application.

FIG. 14 is a schematic structural diagram of a computer device according to an embodiment of this application. The computer device may be configured to implement the image processing method performed by a computer device provided in the foregoing embodiments. A computer device 1400 includes a central processing unit (CPU) 1401, a random access memory (RAM) 1402, a system memory 1404 of a read only memory (ROM) 1403, and a system bus 1405 connecting the system memory 1404 to the CPU 1401. The computer device 1400 further includes a basic input/output system (I/O system) 1406 configured to transmit information between components in the computer, and a mass storage device 1407 configured to store an operating system 1413, an application 1414, and other program module 1415.

The basic I/O system 1406 includes a display 1408 configured to display information and an input device 1409 such as a mouse or a keyboard that is configured for information inputting by a user. The display 1408 and the input device 1409 are both connected to the CPU 1401 by an input/output controller 1410 connected to the system bus 1405. The basic I/O system 1406 may further include the I/O controller 1410, to receive and process inputs from a plurality of other devices, such as the keyboard, the mouse, or an electronic stylus. Similarly, the I/O controller 1410 further provides an output to a display screen, a printer, or another type of output device.

The mass storage device 1407 is connected to the CPU 1401 by a mass storage controller (not shown) connected to the system bus 1405. The mass storage device 1407 and an associated computer-readable medium provide non-volatile storage for the computer device 1400. That is, the mass storage device 1407 may include a non-transitory computer-readable medium (not shown) such as a hard disk or a compact disc ROM (CD-ROM) drive.

In general, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing types. The system memory 1404 and the mass storage device 1407 may be collectively referred to as a memory.

According to the various embodiments of this application, the computer device 1400 may further be connected, through a network such as the Internet, to a remote computer on the network for running. That is, the computer device 1400 may be connected to a network 1412 by a network interface unit 1411 connected to the system bus 1405, or may be connected to another type of network or a remote computer system (not shown) by a network interface unit 1411.

The memory further includes one or more programs. The one or more programs are stored in the memory and configured to be executed by one or more CPUs 1401.

This application further provides a computer-readable storage medium, the readable storage medium storing at least one instruction, at least one program, a code set, or an instruction set, and the at least one instruction, the at least one program, the code set, or the instruction set being loaded and executed by a processor to implement the image processing method provided in any one of the foregoing exemplary embodiments.

An embodiment of this application provides a computer program product or a computer program. The computer program product or the computer program includes computer instructions, the computer instructions being stored in a computer-readable storage medium. A processor of a computer device reads the computer instructions from the computer-readable storage medium, and executes the computer instructions, so that the computer device performs the image processing method provided in the foregoing exemplary implementations.

Those of ordinary skill in the art may understand that all or part of the steps of implementing the foregoing embodiments may be implemented by hardware, or may be implemented by a program instructing related hardware. The program may be stored in a computer-readable storage medium. The storage medium mentioned may be a read-only memory, a magnetic disk or an optical disc.

The foregoing descriptions are merely exemplary embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs image acquisition and/or processing. In practical application, the foregoing functions may be allocated to and completed by different functional modules according to requirements, that is, an inner structure of a device is divided into different functional modules to implement all or a part of the functions described above.

What is claimed is:

1. An image processing method, performed by a computer device, the method comprising:

acquiring an original image sequence, the original image sequence including a plurality of original image frames;

performing image preprocessing on the original image sequence to obtain a feature map sequence corresponding to the original image sequence and a confidence map sequence corresponding to the original image sequence, wherein:

the feature map sequence is a sequence of feature maps obtained by performing feature extraction on all of the original image frames;

the confidence map sequence comprises confidence maps corresponding to all of the original image frames; and each confidence map of the confidence maps corresponds to a respective one of the original image frames and is used for representing confidence levels of pixel points in a respective one of the original image frames during feature fusion;

performing the feature fusion on the feature map sequence based on the confidence map sequence, to obtain a target fused feature map corresponding to a target original image frame in the original image sequence, including:

determining, from the confidence map sequence, a target confidence map corresponding to the target original image frame:

determining, from the feature map sequence, a target feature map corresponding to the target original image frame:

determining a first fused feature map based on the target confidence map and the target feature map;

performing feature fusion on the feature map sequence based on the target confidence map to obtain a second fused feature map, including:

performing redundant feature extraction and feature fusion on the feature map sequence to obtain a third fused feature map, the third fused feature map being fused with redundant image features corresponding to all of the original image frames;

determining a target reverse confidence map based on the target confidence map, wherein a sum of a confidence level in the target confidence map and a confidence level in the target reverse confidence map for a same pixel point is equal to 1; and determining the second fused feature map based on the target reverse confidence map and the third fused feature map; and performing feature fusion on the first fused feature map and the second fused feature map to obtain the target fused feature map; and reconstructing the target original image frame based on the target fused feature map to obtain a target reconstructed image frame.

2. The method according to claim 1, wherein:

determining the first fused feature map based on the target confidence map and the target feature map comprises:

multiplying confidence levels of pixel points in the target confidence map by feature values of the corresponding pixel points in the target feature map respectively, to obtain the first fused feature map.

3. The method according to claim 1, wherein performing feature fusion on the first fused feature map and the second fused feature map to obtain the target fused feature map comprises:

adding feature values in the first fused feature map and feature values at the corresponding positions in the second fused feature map, to obtain the target fused feature map.

4. The method according to claim 1, wherein determining the second fused feature map based on the target reverse confidence map and the third fused feature map comprises:

multiplying confidence levels of pixel points in the target reverse confidence map by feature values of the corresponding pixel points in the third fused feature map respectively, to obtain the second fused feature map.

5. The method according to claim 1, wherein performing the feature fusion on the feature map sequence based on the confidence map sequence, to obtain a target fused feature map corresponding to a target original image frame in the original image sequence comprises:

performing the feature fusion on the feature map sequence based on the confidence map sequence by using a feature fusion network, to obtain the target fused feature map corresponding to the target original image frame in the original image sequence.

6. The method according to claim 1, wherein reconstructing the target original image frame based on the target fused feature map to obtain a target reconstructed image frame comprises:

reconstructing the target original image frame based on the target fused feature map by using a reconstruction network, to obtain the target reconstructed image frame.

7. The method according to claim 1, wherein acquiring the original image sequence comprises:

extracting at least one group of original image sequences from an original video, target original image frames in different original image sequences being corresponding to different timestamps in the original video.

8. The method of claim 1, further comprising:

after reconstructing the target original image frame based on the target fused feature map to obtain the target reconstructed image frame, generating a target video based on the target reconstructed image frames corresponding to all of the original image sequences and timestamps of the target original image frames corresponding to all of the target reconstructed image frames.

9. The method according to claim 1, wherein:

the image preprocessing is performed on the original image sequence by using an image preprocessing network, and the image preprocessing network comprises M confidence level blocks connected in series, M being a positive integer; and performing image preprocessing on the original image sequence to obtain the feature map sequence corresponding to the original image sequence and the confidence map sequence corresponding to the original image sequence comprises:

performing serial processing on the original image sequence by using the M confidence level blocks, to obtain the feature map sequence and the confidence map sequence.

10. A computing device, comprising:

one or more processors; and memory storing one or more programs, the one or more programs comprising instructions that, when executed by the one or more processors, cause the one or more processors to perform operations comprising:

acquiring an original image sequence, the original image sequence including a plurality of original image frames;

performing image preprocessing on the original image sequence to obtain a feature map sequence corresponding to the original image sequence and a confidence map sequence corresponding to the original image sequence, wherein:

the feature map sequence is a sequence of feature maps obtained by performing feature extraction on all of the original image frames;

the confidence map sequence comprises confidence maps corresponding to all of the original image frames; and each confidence map of the confidence maps corresponds to a respective one of the original image frames and is used for representing confidence levels of pixel points in a respective one of the original image frames during feature fusion;

performing the feature fusion on the feature map sequence based on the confidence map sequence, to obtain a target fused feature map corresponding to a target original image frame in the original image sequence, including:

determining, from the confidence map sequence, a target confidence map corresponding to the target original image frame;

determining, from the feature map sequence, a target feature map corresponding to the target original image frame;

determining a first fused feature map based on the target confidence map and the target feature map:

performing feature fusion on the feature map sequence based on the target confidence map to obtain a second fused feature map, including:

performing redundant feature extraction and feature fusion on the feature map sequence to obtain a third fused feature map, the third fused feature map being fused with redundant image features corresponding to all of the original image frames;

determining a target reverse confidence map based on the target confidence map, wherein a sum of a confidence level in the target confidence map and a confidence level in the target reverse confidence map for a same pixel point is equal to 1; and determining the second fused feature map based on the target reverse confidence map and the third fused feature map; and performing feature fusion on the first fused feature map and the second fused feature map to obtain the target fused feature map; and reconstructing the target original image frame based on the target fused feature map to obtain a target reconstructed image frame.

11. The computing device according to claim 10, wherein determining the first fused feature map based on the target confidence map and the target feature map comprises:

multiplying confidence levels of pixel points in the target confidence map by feature values of the corresponding pixel points in the target feature map respectively, to obtain the first fused feature map.

12. The computing device according to claim 10, wherein performing feature fusion on the first fused feature map and the second fused feature map to obtain the target fused feature map comprises:

adding feature values in the first fused feature map and feature values at the corresponding positions in the second fused feature map, to obtain the target fused feature map.

13. The computing device according to claim 10, wherein acquiring the original image sequence comprises:

extracting at least one group of original image sequences from an original video, target original image frames in different original image sequences being corresponding to different timestamps in the original video.

14. The computing device according to claim 10, wherein:

the image preprocessing is performed on the original image sequence by using an image preprocessing network, and the image preprocessing network comprises M confidence level blocks connected in series, M being a positive integer; and performing image preprocessing on the original image sequence to obtain the feature map sequence corresponding to the original image sequence and the confidence map sequence corresponding to the original image sequence comprises:

performing serial processing on the original image sequence by using the M confidence level blocks, to obtain the feature map sequence and the confidence map sequence.

15. A non-transitory computer-readable storage medium, storing one or more instructions, the one or more instructions, when executed by one or more processors of a computing device, cause the computing device to perform operations comprising:

acquiring an original image sequence, the original image sequence including a plurality of original image frames;

performing image preprocessing on the original image sequence to obtain a feature map sequence corresponding to the original image sequence and a confidence map sequence corresponding to the original image sequence, wherein:

the feature map sequence is a sequence of feature maps obtained by performing feature extraction on all of the original image frames;

the confidence map sequence comprises confidence maps corresponding to all of the original image frames; and each confidence map of the confidence maps corresponds to a respective one of the original image frames and is used for representing confidence levels of pixel points in a respective one of the original image frames during feature fusion;

performing the feature fusion on the feature map sequence based on the confidence map sequence, to obtain a target fused feature map corresponding to a target original image frame in the original image sequence, including:

determining, from the confidence map sequence, a target confidence map corresponding to the target original image frame;

determining, from the feature map sequence, a target feature map corresponding to the target original image frame;

determining a first fused feature map based on the target confidence map and the target feature map;

performing feature fusion on the feature map sequence based on the target confidence map to obtain a second fused feature map, including:

performing redundant feature extraction and feature fusion on the feature map sequence to obtain a third fused feature map, the third fused feature map being fused with redundant image features corresponding to all of the original image frames;

determining a target reverse confidence map based on the target confidence map, wherein a sum of a confidence level in the target confidence map and a confidence level in the target reverse confidence map for a same pixel point is equal to 1; and determining the second fused feature map based on the target reverse confidence map and the third fused feature map; and performing feature fusion on the first fused feature map and the second fused feature map to obtain the target fused feature map; and reconstructing the target original image frame based on the target fused feature map to obtain a target reconstructed image frame.

16. The non-transitory computer-readable storage medium according to claim 15, the operations further comprising:

after reconstructing the target original image frame based on the target fused feature map to obtain the target reconstructed image frame, generating a target video based on the target reconstructed image frames corresponding to all of the original image sequences and timestamps of the target original image frames corresponding to all of the target reconstructed image frames.

17. The non-transitory computer-readable storage medium according to claim 15, wherein:

the image preprocessing is performed on the original image sequence by using an image preprocessing network, and the image preprocessing network comprises M confidence level blocks connected in series, M being a positive integer; and performing image preprocessing on the original image sequence to obtain the feature map sequence corresponding to the original image sequence and the confidence map sequence corresponding to the original image sequence comprises:

performing serial processing on the original image sequence by using the M confidence level blocks, to obtain the feature map sequence and the confidence map sequence.

* * * * *